(12) United States Patent
Ghoshal et al.

(10) Patent No.: US 6,832,036 B2
(45) Date of Patent: Dec. 14, 2004

(54) SILOXANE OPTICAL WAVEGUIDES

(75) Inventors: Ramkrisha Ghoshal, Clifton Park, NY (US); Peter D. Persans, Watervliet, NY (US); Navnit T. Agarwal, Hillsboro, OR (US); Joel Plawsky, Albany, NY (US); Shom S. Ponoth, Troy, NY (US)

(73) Assignees: Polyset Company, Inc., Mechanicville, NY (US); Rensselaer Polytechnic Institute, Troy, NY (US)

( * ) Notice: Subject to any disclaimer, the term of this patent is extended or adjusted under 35 U.S.C. 154(b) by 176 days.

(21) Appl. No.: 10/269,246

(22) Filed: Oct. 11, 2002

(65) Prior Publication Data

US 2004/0076391 A1 Apr. 22, 2004

(51) Int. Cl.[7] ................................................. G02B 6/00
(52) U.S. Cl. ...................................... 385/143; 385/145
(58) Field of Search ................................. 385/123, 124, 385/126, 129, 130, 131, 132, 141, 142, 143, 144, 145; 362/582; 65/386

(56) References Cited

U.S. PATENT DOCUMENTS

| | | | |
|---|---|---|---|
| 5,204,930 A | | 4/1993 | Brandt et al. ............... 385/143 |
| 5,463,084 A | | 10/1995 | Crivello et al. ............. 549/214 |
| 6,069,259 A | * | 5/2000 | Crivello ....................... 549/214 |
| 6,088,492 A | * | 7/2000 | Kaneko et al. ............... 385/14 |
| 6,391,999 B1 | * | 5/2002 | Crivello ....................... 549/215 |

FOREIGN PATENT DOCUMENTS

| | | |
|---|---|---|
| EP | 0943935 A2 | 9/1999 |
| EP | 1154323 A1 | 11/2001 |
| WO | WO92/12183 | 7/1992 |
| WO | WO01/53395 A1 | 7/2001 |

OTHER PUBLICATIONS

Nitta et al., Surface Modified Spin–On Xerogel Films as Interlayer Dielectrics; *J. Vacuum Sci. & Techn.* B, 17, 205–12 (1999).

U.S. patent application No. 09/489,405 filed Jan. 21, 2000 entitled "Epoxy Alkoxy Siloxane Oligomers".

* cited by examiner

*Primary Examiner*—John R. Lee
*Assistant Examiner*—James P. Hughes
(74) *Attorney, Agent, or Firm*—Heslin, Rothenberg, Farley & Mesiti, PC; Martha L. Boden, Esq.

(57) ABSTRACT

Optical waveguide structures containing siloxane resin compositions as core materials and a method for preparing the waveguides are disclosed. The siloxane resin compositions can be cured by thermal energy or actinic radiation. In addition, conventional patterning techniques can be used, which makes the present method ideal for practicing on a commercial scale. The optical waveguides of the invention exhibit very low optical losses and are compatible with silicon processing requirements, which makes them useful in integrated circuitry. In addition, the high refractive index contrasts between the siloxane resin core and various claddings, including other siloxane resins, makes the waveguides particularly desirable.

32 Claims, 4 Drawing Sheets

SILOXANE OPTICAL WAVEGUIDES

FIELD OF THE INVENTION

This invention relates generally to optical waveguides, and more particularly to optical waveguides having a core containing a siloxane polymer and a method for fabricating the waveguides.

BACKGROUND OF THE INVENTION

As devices and interconnects used in integrated circuits continue to decrease in size, the speed with which information can be encoded and sent through the circuit by way of interconnects has become a significant factor in determining the ultimate speed of the integrated circuit itself. To increase these interconnect speeds, optical components can be incorporated into the integrated circuit or microprocessor.

In an optical or photonic interconnect system, an electrical signal is converted into an optical signal in one portion of a circuit, transmitted to another part of the circuit several millimeters or centimeters away, and converted back into an electrical signal at the new location. To operate, optical interconnects require sources, modulators, a transmission medium, and receivers. Optical interconnects on the multi-chip module, chip-to-chip, or chip-to-board level also involve integrated passive waveguides, light-steering components, and active optical devices, such as active optical waveguides. With respect to active optical waveguide architectures, light propagates parallel to the substrate surface in planar waveguide structures and perpendicular to the surface in stacked structures.

In planar waveguide designs, active optical waveguides include a core and a cladding material contacting and partially or entirely surrounding the core. In addition, the core material must have a higher refractive index than the cladding. For an electrical/photonic scheme, an optical waveguide having a thin core and cladding ($\leq 10$, but preferably less than 5 $\mu$m) and small bending radii (<10 $\mu$m) is most desirable. A thin core and cladding allow small inter-waveguide spacing for a given amount of crosstalk. In addition, tighter turns for a given value of radiation loss can be achieved by having a high refractive index contrast ($\Delta n$) between the core and the cladding of the waveguide. Applications for high refractive index contrast waveguide systems include dense on-chip interconnects and other VLSI photonics components such as micro-ring resonators.

Because integrated circuits are conventionally silicon-based materials, optical waveguides for use therein must be fully compatible with silicon processing at the back end of the line and/or with other steps used in processing these circuits. Desirable materials should exhibit the following properties: 1) good adhesion to interconnect metals, e.g., copper and aluminum, using, if necessary, adhesion promoters and/or buffer layers; 2) good adhesion to silicon and silicon oxide; 3) good thermal stability at temperatures up to 350° C. for short processing times (e.g., 30 minutes) and 150° C. for long periods (e.g., several hours); and 4) the capability of being processed into waveguides and couplers using techniques, chemicals, temperatures, and other conditions that are compatible with silicon chip processing. The materials should also be stable during phase transitions (i.e. crystallization or melting), be chemically stable, and be stable in terms of optical loss, index of refraction, and density.

In addition to being compatible with silicon circuitry, optical waveguides should meet the demands of low optical loss, as well as meet the requirements of an electronic environment. For example, for use in on-chip applications, it is desirable that the optical loss at each wavelength of interest be less than 1 dB/cm in a 2 micron by 2 micron cross-section straight waveguide.

Particular wavelengths of interest for information transfer generally lie from about 400 nm to about 2000 m for specialty (sensor) applications. Certain useful wavelengths include, e.g., 635 nm, 840 nm, 900 nm, 1300 nm, and 1550 nm, with the longer wavelengths corresponding to common communications systems.

As mentioned above, to be of significant use, optical waveguides should have a high refractive index contrast ($\Delta n$) between the waveguide core and the cladding. The difference in refractive indices must be at least 0.02, but is more preferably 0.05 or higher.

The waveguides of the present invention exhibit unexpectedly low optical losses and meet the aforementioned compatibility needs and the refractive index contrast requirements.

SUMMARY OF THE INVENTION

It should be noted that variables are defined when introduced and retain that definition throughout.

In one aspect, the present invention relates to optical waveguide structures comprising a light-transmitting core material having a first refractive index, and a cladding material contacting and partially or entirely surrounding the core material. The cladding material has a second refractive index lower than the first refractive index of the core material. The core material is a siloxane resin composition comprising:

(A) from about 95 to about 100 parts by weight of a siloxane polymer comprising structural units having the formulae X and Y:

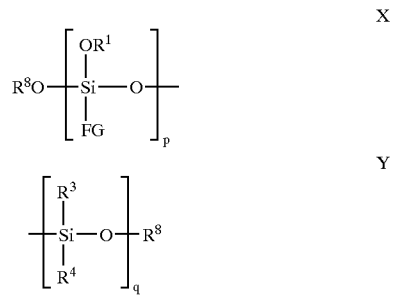

and terminating in residues $OR^8$ and $R^8$, wherein
  (1) FG is a functional group, and each FG in said polymer is independently chosen from
    (a) linear, branched, and cyclic alkyl residues of 1 to 20 carbons terminating in a 1-alkenyl ether;
    (b) linear, branched, and cyclic alkyl ether residues of 1 to 20 carbons and 1 to 9 oxygens terminating in a 1-alkenyl ether;
    (c) linear, branched, and cyclic alkyl residues of 1 to 20 carbons terminating in an acrylate, an alpha-chloroacrylate, an alpha-cyanoacrylate, or a methacrylate;
    (d) linear, branched, and cyclic alkyl ether residues of 1 to 20 carbons and 1 to 9 oxygens terminating in an acrylate, an alpha-chloroacrylate, an alpha-cyanoacrylate, or a methacrylate;
    (e) linear, branched, and cyclic alkyl residues of 1 to 20 carbons substituted with an epoxide;

(f) linear, branched, and cyclic alkyl ether residues of 1 to 20 carbons and 1 to 9 oxygens substituted with an epoxide;
(g) arylalkyl residues of 1 to 20 carbons substituted with an epoxide;
(h) arylalkyl ether residues of 1 to 20 carbons and 1 to 9 oxygens substituted with an epoxide; and
(i) epoxy-functional organosiloxane residues of 1 to 20 silicons and 1 to 20 carbons;

(2) R is alkyl, aryl, haloalkyl, or aralkyl of 1 to 10 carbons;
(3) $R^1$ is R,

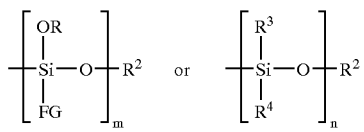

(4) $R^2$ is alkyl, aryl, haloalkyl or aralkyl of 1 to 10 carbons or

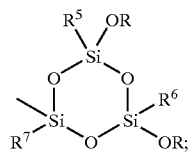

(5) $R^3$ and $R^4$ are independently alkyl, aryl, haloalkyl, aralkyl, alkoxy or aryloxy of 1 to 10 carbons;
(6) $R^5$, $R^6$ and $R^7$ are independently FG, alkyl, aryl, haloalkyl, aralkyl, alkoxy or aryloxy of 1 to 10 carbons;
(7) $R^8$ is alkyl, aryl, haloalkyl, or aralkyl of 1 to 10 carbons;
(8) m and n are each independently 2 to 50;
(9) p is 2 to 50; and
(10) q is 0 to 50; and
(B) from 0 to about 5 parts by weight of a polymerization initiator selected from the group consisting of free radical initiators and cationic initiators selected from the group consisting of diazonium, sulfonium, phosphonium, and iodonium salts, wherein said selected cationic initiator is present in a catalyst solution comprising from about 20 to about 60 parts by weight of the selected cationic initiator and from about 40 to about 80 parts by weight of 3,4-epoxycyclohexylmethyl-3',4'-epoxycyclohexane carboxylate, dicyclopentadiene dioxide, or bis(3,4-epoxycyclohexyl) adipate.

Preferred cladding materials include siloxanes and fluorinated siloxanes having a lower refractive index than the core, as described below, silica xerogels (i.e., porous silicon oxide), silicon oxide, metal oxides, air, silicon dioxide, benzocyclobutene, plasma oxides, acrylates, fluorinated acrylates, polyimides, and other polymers having a lower refractive index than the core.

In another aspect, the present invention relates to optical waveguide structures comprising:
[1] a light-transmitting core material comprising a first siloxane resin composition having a first refractive index, wherein the first siloxane resin composition comprises:
[1] from about 95 to about 100 parts by weight of a first siloxane polymer;
(2) from about 0 to about 5 parts by weight of a first polymerization initiator independently selected from those previously described; and
(B) a cladding material comprising a second siloxane resin composition having a second refractive index lower than the first refractive index of the first siloxane resin composition. The cladding material contacts and partially or entirely surrounds the core material. The second siloxane resin composition comprises:
(1) from about 95 to about 100 parts by weight of a second siloxane polymer;
(2 from about 0 to about 5 parts by weight of a second polymerization initiator, independently selected from those previously described.

The first and second siloxane polymers each contain independently selected structural units X and optionally, Y, and terminate in residues $OR^8$ and $R^8$, as described above. Each FG, R, $R^1$, $R^3$, $R^4$, $R^5$, $R^6$, $R^7$, $R^8$, m, n, p, and q of the first siloxane polymer is selected independently from that of the second siloxane polymer.

In another aspect, the present invention relates to a method for fabricating an optical waveguide structure. The method includes the following steps:
(1) providing a substrate;
(2) forming a first layer of a cladding material over the substrate, wherein the cladding material has a second refractive index;
(3) depositing atop the first layer of cladding material a core layer comprising
(A) from 0 to about 95 wt. % solvent; and
(B) from about 5 to about 100 wt. % of a core siloxane resin composition comprising:
(I) from about 95 to about 100 parts by weight of a core siloxane polymer, wherein said core siloxane polymer comprises structural units having formulae X and Y and terminating in residues $OR^8$ and $R^8$, as previously described; and
(II) from about 0 to about 5 parts by weight of a core polymerization initiator, as previously described, and
(4) curing the core layer thermally, or using actinic or e-beam radiation to form a light-transmitting core material having a first refractive index higher than said second refractive index of said cladding material.

Optionally, after step (4), the method can also include forming a second layer of cladding material atop the light-transmitting core material. In addition, prior to adding the second layer of cladding material, the light-transmitting core material can be patterned, such that a portion of the first layer of cladding material is free of the light-transmitting core. Also, when actinic radiation is used to cure the core layer, patterning may be performed simultaneously with curing. Alternatively, between steps (3) and (4), the core layer can be patterned before curing.

In another aspect, the method may include the step of forming a groove in the first layer of cladding material between steps (2) and (3). However, the substrate remains covered with the first cladding layer. Then, the core layer is also deposited into the groove. After curing, the light-transmitting core material overlying the first layer of cladding material may be removed, but the light-transmitting core material remains in the groove. A second layer of cladding material can be formed atop the first layer of cladding material and atop the light-transmitting core material in the groove.

DETAILED DESCRIPTION OF THE INVENTION

Figure 1:
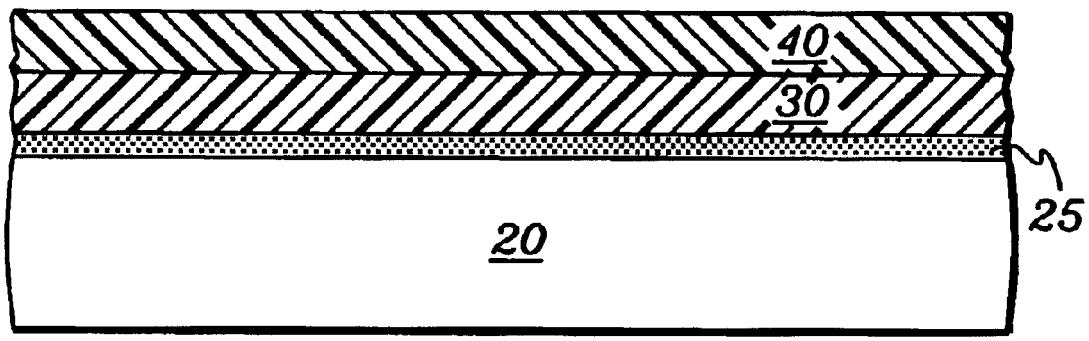
FIG. 1 is a cross-sectional view of a preferred optical waveguide embodiment fabricated by the method of the present invention.

The present invention includes novel optical waveguide structures which exhibit surprisingly low optical losses and a method for forming these novel waveguides. The waveguide structures comprise a light-transmitting core material and a cladding material contacting and partially or entirely surrounding the core. The core material comprises a siloxane polymer, either a homopolymer or a copolymer, and optionally, a polymerization initiator. The cladding material is any suitable waveguide cladding material having a lower refractive index (also referred to herein as R.I. or index of refraction) than that of the siloxane core material. For example, in this invention, silica xerogels meet the requirements for cladding materials. In addition, the waveguides may be comprised completely of siloxanes (with or without a polymerization initiator), wherein the light-transmitting siloxane core material has a higher index of refraction than that of the siloxane cladding.

Waveguide Siloxane Polymers

The siloxane polymers contained in the core material of the present waveguides, and optionally the cladding, as discussed below, include structural units of formula X, and, optionally Y, and terminate in residues $OR^8$ and $R^8$.

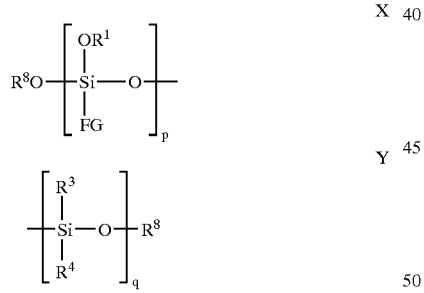

In these formulae FG is a functional group, and the various numbered R groups are as previously defined. When q is 0, the siloxane polymer in the waveguide core material (or cladding) is a homopolymer, which contains only structural units X above. When q is an integer greater than 0, the polymers are copolymers, which include block oligomers and random polymers.

In a preferred embodiment, FG is one or more residues chosen from formulae A–Q:

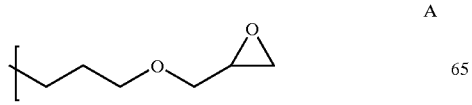

A

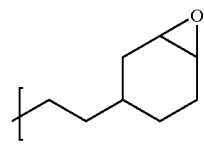

B

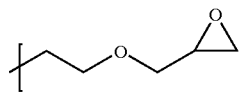

C

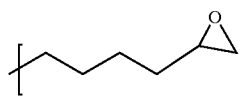

D

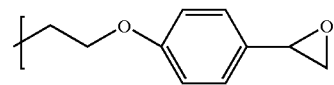

E

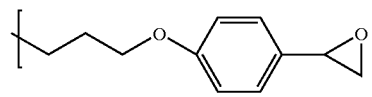

F

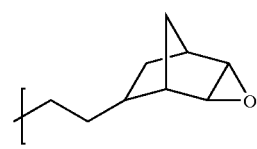

G

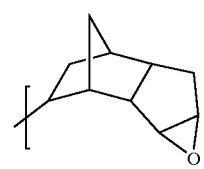

H

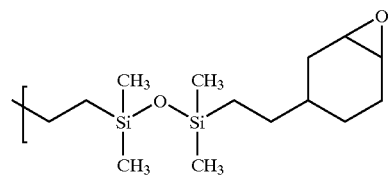

J

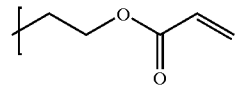

K

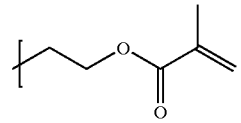

L

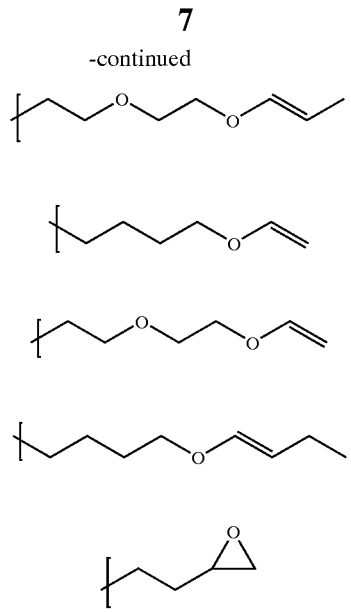

M

N

O

P

Q

From among these residues, 3-glycidoxypropyl (structure A), 2-(3,4-epoxycyclohexylethyl) (structure B), and 1-propenoxy-2-ethoxyethyl (structure C) are preferred. In addition, $R^1$ is preferably methyl or ethyl or

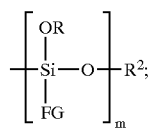

$R^2$ is preferably methyl, methoxy, ethyl, ethoxy, phenyl or

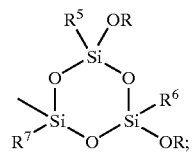

R is preferably methyl or ethyl;

$R^3$ and $R^4$ are independently and preferably methyl, methoxy, ethyl, ethoxy, haloalkyl, or phenyl; and $R^5$, $R^6$ and $R^7$ independently and preferably methyl, methoxy, ethyl, ethoxy, phenyl or FG. $R^8$ is preferably methyl or ethyl. As will be apparent to the artisan, the ratios of residues represented by $R^5$, $R^6$ and $R^7$ in a random oligomer will reflect the ratio and relative reactivities of X to Y in the monomer mix from which the polymer is prepared.

The effective molecular weight and viscosities of the of the siloxane polymers included in the light-transmitting core material (and optionally, cladding) of the present waveguide structures may be varied greatly. In general, molecular weights (prior to curing) range from about 2000 to about 10,000 grams/mole.

As stated above, when q is 0, the polymer chain is composed of only X siloxane monomer units, and p is generally from two to fifty, but preferably from two to twenty. A particularly preferred homopolymer has the following structure (I)

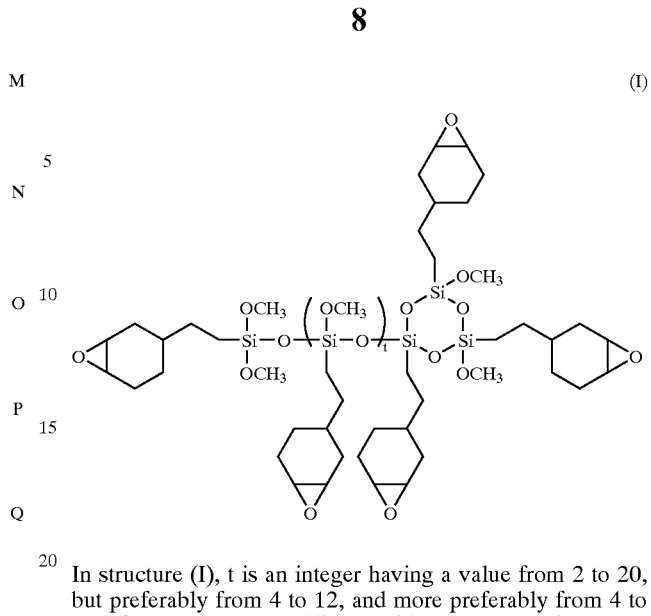

In structure (I), t is an integer having a value from 2 to 20, but preferably from 4 to 12, and more preferably from 4 to 6 or from 7 to 12. In addition, with respect to units X, FG in structure (I) is 2-(3,4-epoxycyclohexylethyl)(formula B above), R is methyl, $R^1$ is

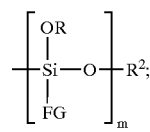

$R^2$ is

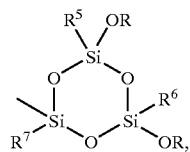

$R^5$, $R^6$, and $R^7$ are each 2-(3,4-epoxycyclohexylethyl), and $R^8$ is methyl.

This preferred cycloaliphatic epoxy siloxane having structure (I), wherein t is an integer from 2 to 20, may be prepared according to the method disclosed by J. V. Crivello and Z. Mao at *Chem. Mater.* 9, 1554–61 (1997). In addition, these siloxanes are commercially available from Polyset Company, Mechanicville, N.Y. as PC-2003 and PC-2000. In the PC-2003 resin, t in structure (I) is an integer from 4 to 6. PC-2003 has a molecular weight ranging from about 2000 to 3500 g/mole. The value of t in PC-2000 ranges from 7 to 12 and its molecular weight ranges from 5000 to 7500 g/mole. PC-2003 and PC-2000 are colorless to very pale yellow semi-solids having a very high viscosity at room temperature.

The siloxane units, X, and when included, Y, having terminal residues $OR^8$ and $R^8$, are synthesized by base-catalyzed hydrolysis and subsequent condensation of an alkoxy silane monomer of Formula $(RO)_3SiFG$ using 0.5 to 2.5 equivalents of water in the presence of an ion exchange resin, optionally in the presence of a solvent, followed by separation of the resin from the siloxane oligomer. In the above formula, it is preferred that the alkoxy group (RO) is methoxy or ethoxy and that the functional group FG not be polymerizible at a rate comparable to that of the alkoxy siloxane. An example of a useful silane monomer from which structure (I) may be prepared, is 2-(3,4-epoxycyclohexylethyl)trimethoxy silane, i.e., FG is 2-(3,4-epoxycyclohexylethyl) and R is methyl in $(RO)_3SiFG$.

When q is greater than 0 (copolymers and block polymers), one or more alkoxy silane monomers of formula $R^3R^4R^8OSiOR^{2a}$ is/are added to the reaction mixture. $R^{2a}$ is alkyl, aryl, haloalkyl or aralkyl of 1 to 10 carbons, and the other various residues are as previously defined. Preferably, $R^{2a}$ is methyl or ethyl; $R^3$ and $R^4$ are independently methyl, methoxy, ethyl, ethoxy, and phenyl; and $R^8$ is methyl or ethyl.

Furthermore, when q≠0, the copolycondensation can be conducted simultaneously with all the components to provide a random distribution of the resulting repeating units X and Y in the polymer. Alternatively, the reaction can be conducted in a sequential fashion. In this latter case, a second alkoxysilane containing either structure X or Y is added after the first substrate has been consumed by the reaction. This results in an oligomer in which like repeating units occur together in a block structure.

When the final waveguide core material (and optionally cladding) includes a siloxane copolymer (q≠0), monomers that provide the Y units include: tetraethoxysilane (ethylorthosilicate), tetramethoxysilane (methylorthosilicate), tetraisopropoxysilane, methyltrimethoxysilane, ethyltriethoxysilane, hexyltriethoxysilane, cyclohexyltrimethoxysilane, 1,1,1-trifluoroethyltriethoxysilane, phenyltriethoxysilane, phenylmethyldiethoxysilane, phenylmethyldimethoxysilane, diphenyldimethoxysilane, 2-phenylethyltrimethoxysilane, benzyltriethoxysilane, vinyltrimethoxysilane, dimethyldimethoxysilane, dimethyldiethoxysilane, trimethylmethoxysilane, diethyldimethoxysilane, allyltrimethoxysilane, divinyldimethoxysilane, methyvinyldimethoxysilane, bis(triethoxysilyl)methane, bis(triethoxysilyl)ethane, butenyltrimethoxysilane, trifluoropropylmethyldimethoxysilane, 3-bromopropyltrimethoxysilane, 2-chloroethylmethyldimethoxysilane, 1,1,2,2-tetramethoxy-1,3-dimethyldisiloxane, phenyltrimethoxysilane. Of these, diphenyldimethoxysilane and dimethyldiethoxysilane are particularly preferred. Also, useful in these mixtures are trimethoxysilyl-terminated polydimethylsiloxanes as well as the corresponding hydroxyl-terminated polydimethylsiloxanes. The foregoing monomers are either commercially available or readily synthesized by reactions well known in the art.

In one preferred embodiment containing both X and Y units, $R^{2a}$ and $R^8$ are methyl groups in silane formula $R^3R^4R^8OSiOR^{2a}$, and $R^3$ and $R^4$ are phenyl groups, i.e., diphenyldimethoxysilane. In $(RO)_3SiFG$, FG is 2-(3,4-epoxycyclohexylethyl) and R is methyl, i.e., 2-(3,4-epoxycyclohexylethyl)trimethoxysilane, which is available from Witco Corporation as A-186 (resulting in $R^1$ being methyl in the final siloxane polymer). In this embodiment, the preferred ratio (X:Y) of the monomer providing X units to that providing Y units (i.e., p:q) ranges from 8:1 to 1:1, but is more preferably about 4:1 to 2:1. In the resulting siloxane polymer, $R^1$ is methyl and FG is 2-(3,4-epoxycyclohexylethyl) in the X units; substituents $R^3$ and $R^4$ in the Y units are both phenyl groups; and $R^8$ is methyl. The molecular weight of the resulting copolymer (Polyset PC 2010) ranges from 5 to 7.5 kg/mole, and the R.I. of the polymer after curing ranges from about 1.4 to about 1.6. In another preferred embodiment, $R^{2a}$ and $R^8$ are methyl groups, and $R^3$ and $R^4$ are ethyl groups, i.e., dimethyldiethoxysilane, which is available from United Chemical Technologies, Inc. (UCT) as D5600, and the ratio of 2-(3,4-epoxycyclohexylethyl)trimethoxysilane to dimethyldiethoxysilane (X:Y), and p:q, ranges from about 7:1 to about 4:1. The resulting random copolymer, wherein $R^1$ and $R^8$ are methyl groups, $R^3$ and $R^4$ are ethyl groups and FG is 2-(3,4-epoxycyclohexylethyl) is available from Polyset as PC-2021. The molecular weight of PC-2021 ranges from about 5 to 7.5 g/mole. In another preferred embodiment, $R^{2a}$ and $R^8$ are methyl groups, $R^3$ is trifluoropropyl, and $R^4$ is a methyl group, i.e., trifluoropropylmethyldimethoxysilane, which is available from UCT as T-2842, and the ratio of 2-(3,4-epoxycyclohexylethyl)trimethoxy silane to trifluoropropylmethyldimethoxysilane, (X:Y) and p:q, is typically about 3:1. The resulting random copolymer, wherein $R^1$ and $R^8$ are methyl groups, $R^3$ is trifluoropropyl, $R^4$ is a methyl group, FG is 2-(3,4-epoxycyclohexylethyl), has a molecular weight ranging from about 5 to 7.5 g/mole and is available from Polyset as PC-2026. Other preferred embodiments may be synthesized from methyltrimethoxysilane ($R^{2a}$, $R^3$, $R^4$, and $R^8$ are methyl groups), phenyltrimethoxysilane ($R^{2a}$ and $R^8$ are methyl, $R^4$ is methoxy, and $R^3$ is phenyl), methylphenyldimethoxysilane ($R^{2a}$, $R^3$, and $R^4$ are methyl, and $R^4$ is phenyl). For many purposes, polymers in which the sum of p and q is from 4 to 20 are preferred.

Examples and methods of preparing these siloxane polymers, as well as reaction conditions, both when q is 0 (structural units X only) and when q is ≠0 (structural units X and Y), are disclosed in detail in commonly assigned U.S. Pat. No. 6,069,259 to Crivello and pending U.S. patent application Ser. No. 09/489,405 filed Jan. 21, 2000, respectively. As stated above, the hydrolysis-condensation reaction is catalyzed by an ion exchange resin, such as a highly crosslinked bead, which permits complete removal of the catalyst from the reaction mixture by filtration. From 0.5 to 2.5 equivalents of water are used in the reaction. Exemplary resins include ion exchange resins such as Amberlite A-27, Amberlite IRA-400 and Amberlite IRA-904 from Rohm and Haas Corp. having the following structure:

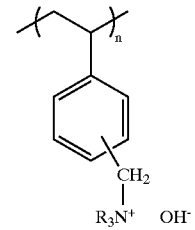

Most advantageously, the ion exchange resin will be in a crosslinked bead form that permits recovery from the reaction mixture by simple filtration. The ion-exchange resin catalyst may be reused in subsequent sol-gel reactions. Alternatively, the condensation may be carried out as a continuous process on a fixed bed of the resin, which is then removed.

Furthermore, the reaction is typically carried out in a solvent in which both the starting silane monomers and the siloxane product are soluble. Alcohols such as ethanol, t-butanol, n-propanol and isopropanol are preferred, and of these, n-propanol is the most preferred. Exemplary reactions and their conditions are reported in the aforementioned U.S. Pat. No. 6,069,259 to Crivello and pending U.S. patent application Ser. No. 09/489,405.

Optional Polymerization Initiators and Catalyst Solutions

With respect to curing the siloxane polymers, a thermal treatment may be used. In addition, to polymerize the polymers further via the functional groups FG, either before or after the solvent is removed, up to 5 parts by weight of a polymerization initiator may be employed. For polymerization of acrylate and methacrylate functional polymers, peroxide and azo free radical initiators may be used to cure the polymers thermally or by photoinitiation. A plethora of free radical photoinitiators may be used including, for example, benzoin, benzoin alkyl ethers, 1,1-diethoxyacetophenone, 1-benzoylcyclohexanol and many others. Epoxy, 1-propenyl ether, 1-butenyl ether and vinyl ether functional oligomers can be thermally cured or photopolymerized using UV or visible irradiation, i.e. actinic, or electron beam irradiation in the presence of a cationic initiator such as a diazonium, sulfonium, phosphonium, or iodonium salt, but more preferably a diaryliodonium, dialkylphenacylsulfonium, triarylsulfonium, or ferrocenium salt photoinitiator.

A preferred FG group polymerization cationic initiator, when used, is a diaryliodonium salt selected from the group having formulae (II), (III), (IV), (V), and (VI)

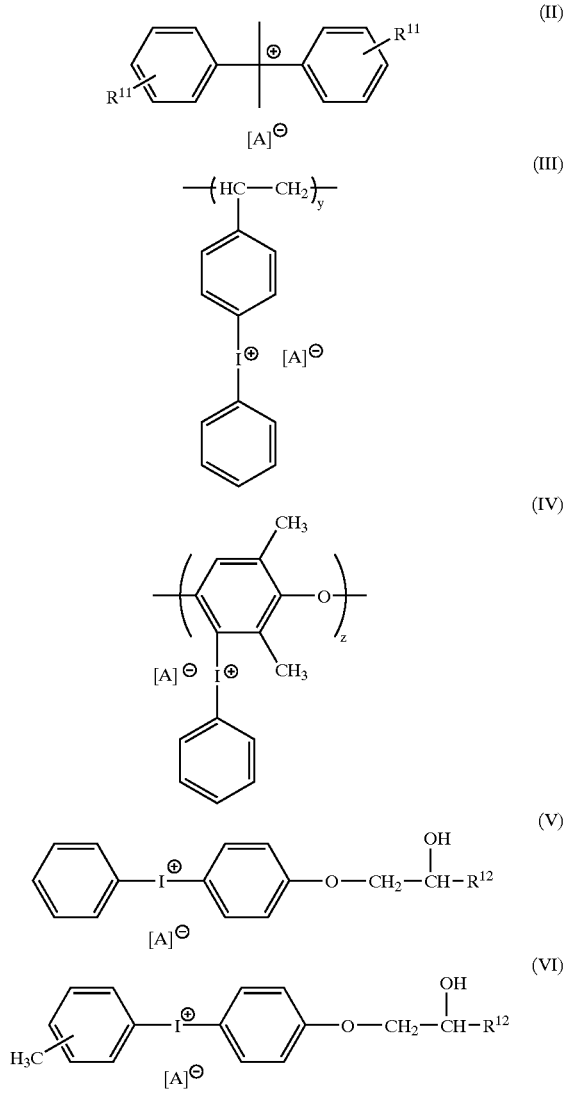

wherein each $R^{11}$ is independently hydrogen, $C_1$ to $C_{20}$ alkyl, $C_1$ to $C_{20}$ alkoxyl, $C_1$ to $C_{20}$ hydroxyalkoxyl, halogen, and nitro; $R^{12}$ is $C_1$ to $C_{30}$ alkyl or $C_1$ to $C_{30}$ cycloalkyl; y and z are each independently integers having a value of at least 5; $[A]^\ominus$ is a non-nucleophilic anion, commonly $SbF_6^\ominus$, $BF_4^\ominus$, $PF_6^\ominus$, $AsF_6^\ominus$, or $(C_6F_5)_4B^\ominus$. These diaryliodonium salt curing agents are described in U.S. Pat. Nos. 4,842,800, 5,015,675, 5,095,053, and 5,073,643, and pending U.S. patent application Ser. No. 10/177,549 filed Jun. 21, 2002.

Preferably, when a cationic initiator is used, it is dissolved in 3,4-epoxycyclohexylmethyl-3',4'-epoxycyclohexane carboxylate, dicyclopentadiene dioxide, or bis(3,4-epoxycyclohexyl) adipate to form a catalyst solution which contains from about 20 to about 60 parts by weight of the selected cationic initiator and from about 40 to about 80 parts by weight of 3,4-epoxycyclohexylmethyl-3',4'-epoxycyclohexane carboxylate, dicyclopentadiene dioxide, or bis(3,4-epoxycyclohexyl) adipate. As stated above, more preferably, the cationic initiator is a diaryliodonium salt, and most preferably, the catalyst solution contains about 40 parts by weight of the diaryliodonium salt curing agent and about 60 parts by weight 3,4-epoxycyclohexylmethyl-3',4'-epoxycyclohexane carboxylate, dicyclopentadiene dioxide, or bis(3,4-epoxycyclohexyl) adipate. Also, when included in the composition, up to about 5 parts by weight of the catalyst solution can typically be added to an appropriate amount of siloxane polymer resin (ranging from about 95 to about 100 parts by weight siloxane polymer).

Preferred diaryliodonium salts include [4-(2-hydroxy-1-tetradecyloxy)-phenyl] phenyliodonium hexafluoroantimonate having structure (V), wherein $[A]^\ominus$ is $SbF_6^\ominus$, and $R^{12}$ is $C_{12}H_{25}$ (available from Polyset Company, as PC-2506); [4-(2-hydroxy-1-tetradecyloxy)-phenyl] phenyliodonium hexafluorophosphate, wherein in structure (V), $[A]^\ominus$ is $PF_6^\ominus$, and $R^{12}$ is $C_{12}H_{25}$ (available from Polyset Company as PC-2508); [4-(2-hydroxy-1-tetradecyloxy)-phenyl] 4-methylphenyliodonium hexafluoroantimonate (structure (VI), wherein $[A]^\ominus$ is $SbF_6^\ominus$, and $R^{12}$ is $C_{12}H_{25}$), and [4-(2-hydroxy-1-tetradecyloxy)-phenyl] 4-methylphenyliodonium hexafluorophosphate (structure (VI) wherein $[A]^\ominus$ is $PF_6^\ominus$, and $R^{12}$ is $C_{12}H_{25}$). The preparation of cationic initiators having structure (VI) is discussed in the aforementioned pending U.S. patent application Ser. No. 10/177,549.

Another preferred cationic polymerization initiator is a phenylacylsulfonium salt having formula (VII)

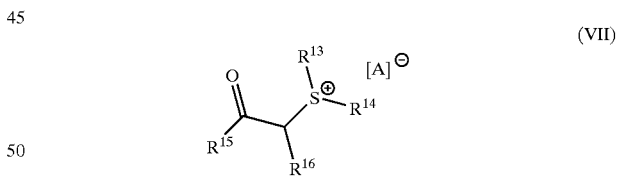

wherein $R^{13}$ is a $C_1$ to $C_{30}$ monovalent organic radical; $R^{14}$ is a $C_1$ to $C_{30}$ monovalent organic radical, or $R^{13}$ and $R^{14}$ taken together may form a 5 or 6-membered ring; $R^{15}$ is $C_6$ to $C_{20}$ alkyl, aryl, $C_6$ to $C_{20}$ substituted alkyl or substituted aryl; $R^{16}$ is hydrogen or $C_1$ to $C_8$ alkyl; and $[A]^\ominus$ is a non-nucleophilic anion, such as previously listed. $R^{14}$ may also be a photosensitizing residue.

Preferred compounds of structure (VII) are those in which the non-nucleophilic anion, $A^\ominus$, is one of the ones previously listed; $R^{15}$ is aryl or substituted aryl; $R^{16}$ is hydrogen; $R^{13}$ is $C_{14}$ to $C_{30}$ alkyl, aryl, $C_{14}$ to $C_{30}$ substituted alkyl or substituted aryl; and $R^{14}$ is $C_1$ to $C_{30}$ alkyl, aryl, $C_1$ to $C_{30}$ substituted alkyl or substituted aryl. Examples of preferred $R^{15}$ groups are phenyl; indan-1-one-2-yl; α-tetralone-2-yl; biphenylyl; naphthyl; perylenyl, pyrenyl, anthracenyl, tetracenyl, coronenyl, benzoylphenyl, 9-oxothioxanthenyl; and phenyl substituted with halogen, nitro or alkoxy. Preferably $R^{16}$ is hydrogen. One set of preferred embodiments is the genus in which $R^{15}$ is phenyl; $R^{13}$ is $C_8$ to $C_{30}$, preferably $C_4$ to $C_{30}$, alkyl; $R^{14}$ is lower alkyl; and $R^{16}$ is hydrogen. Preferred dialkylphenacylsulfonium salts are fully described in U.S. Pat. No. 6,031,014 to Crivello issued Feb. 29, 2000. In addition, triarylsulfonium salts, such as the mixture of S,S-diphenyl-4-thiophenoxyphenylsulfonium hexafluoroantimonate and bis(diphenylsulfonio)4,4'-diphenylsulfide bishexafluoroantimonate may be used, and such salts are commercially available from Polyset Company as PC-2505.

An exemplary thermal process for curing siloxane resin compositions includes heating a 5 μm film of the material containing the siloxane and optional polymerization initiator at a temperature ranging from about 150° C. to about 180° C. for a time ranging from about 30 minutes to about 3 hours. Preferably, the temperature is about 165° C., and the time ranges from about 1½ to 2 hours, depending on the substrate. Furthermore, by changing the structures of the materials included within the polymer, by varying their concentrations, and the thickness of the film, the onset curing temperature and the speed of cure can be adjusted within a wide latitude. Curing can alternatively be induced by irradiation of the cationic polymerization initiator/siloxane resin by UV or visible light, i.e. actinic radiation, or by e-beam radiation. E-beam curing is described in U.S. Pat. Nos. 5,260,349 and 4,654,379.

Typically, when the siloxane films are thermally cured, the amount of catalyst can be decreased dramatically (or eliminated entirely) relative to the amount of photocatalyst needed to effect a cure induced by actinic radiation. For instance, in a thermal treatment, an exemplary siloxane resin composition contains about 0.1 wt. % catalyst (i.e. 0.1 parts by weight catalyst solution and about 99.9 parts by weight siloxane polymer, wherein an exemplary catalyst solution is a 40 wt. % solution of [4-(2-hydroxy-1-tetradecyloxy)-phenyl] phenyliodonium hexafluoroantimonate (Polyset PC-2506) dissolved in 3,4-epoxycyclohexylmethyl 3',4'-epoxycyclohexanecarboxylate (Union Carbide ERL-422 E)). By contrast, when the curing process is done by photo-irradiation, the amount of the catalyst is about 4 wt. % (i.e. 4 parts by weight catalyst solution and 96 parts polymer).

For thinner waveguide core (optionally cladding) layers (<5 μm) or to decrease the viscosity of the composition, the liquid siloxane resin composition may be thinned with additional solvent to form a film containing up to about 95 wt. % solvent, but preferably ranging from about 28 wt. % to about 95 wt. % solvent. Exemplary solvents include mesitylene or solvent blends, such as 50/50 methylethyl ketone (MEK)/1-methoxy-2-propanol acetate (PMA). PMA is also known as propylene glycol methyl ethyl acetate. This excess solvent must be removed either before or after curing, for example, by heating. For undiluted polymer liquid, any solvent in the composition may be removed under vacuum.

A typical spin-cast film thickness is preferably about 5 microns for a spin speed of 6000 rpm. In instances where it is necessary to deposit the siloxane polymers directly onto a silicon wafer, i.e., when the cladding is also one of the siloxane resin compositions, as discussed below, an adhesion promoter, such as HMDS (hexamethyldisiloxane), can be precoated onto the wafer first, if desired.

It should be noted that the following examples are included for illustrative purposes only, and that the invention is in no way limited to the embodiments used in the examples. In addition, the reactants and reagents used in the reactions described herein are readily available materials. Such materials can be conveniently prepared in accordance with conventional preparatory procedures or obtained from commercial sources. It should also be noted that in these examples, the intended wavelengths used in the optical measurements were 635 nm and 840 nm. However, in practice, one of skill will understand that the actual wavelength may vary experimentally from about 630 nm to about 640 nm and from about 835 nm to about 845 nm, respectively.

Siloxanes and Refractive Index Measurements

Refractive index and thickness measurements were made on the siloxane resin compositions before and after curing by conventional angle dependent waveguide coupling measurements and ellipsometry techniques. Prism coupling was used to measure optical losses in the films.

EXAMPLE 1

Siloxane resin solutions, denoted as Sample 1, Sample 2, and Sample 3 were prepared. Samples 1 and 2 contained homopolymer siloxanes depicted above as structure (I) (only units X, q=0). The molecular weights of the uncured resin samples in Sample 1 ranged from 5 to 7.5 kg/mole (Polyset PC-2000) and those in Sample 2 ranged from 2 to 3.5 kg/mole (Polyset PC-2003). Sample 3 contained both monomers X and Y, and in the siloxane polymer, $R^1$ was methyl and FG was 2-(3,4-epoxycyclohexylethyl) in the X units; substituents $R^3$ and $R^4$ in the Y units were both phenyl groups; and $R^8$ was methyl. Sample 3 (Polyset PC 2010) contained 70 parts by weight X units and 30 parts by weight Y units. The molecular weight of the resulting copolymer ranged from 5 to 7.5 kg/mole.

Sample solutions 1, 2, and 3 contained 96 parts by weight of the polymer solution and 4 parts by weight of the catalyst solution. The catalyst solution was a 40 wt. % solution of [4-(2-hydroxy-1-tetradecyloxy)-phenyl]phenyliodonium hexafluoroantimonate (Polyset PC-2506) dissolved in 3,4-epoxycyclohexylmethyl 3',4'-epoxycyclohexanecarboxylate (Union Carbide ERL-4221E). From 40 to 400 parts by weight of a 50/50 solvent blend of methylethyl ketone and 1-methoxy-2-propanol acetate (MEK/PMA) were added to each of the sample compositions (i.e., from about 28 wt. % to about 80 wt. % solvent) to improve spinnability. Each polymer/solvent composition was then spun onto a separate silicon wafer at 6000 rpm for 1 minute, then baked in an oven at 100° C. for 20 minutes to remove the solvent. Prior to curing, refractive index and thickness measurements were made on the films using both angle dependent waveguide coupling measurements and ellipsometry. The films were then flood exposed to UV light for curing (>300 mJ/cm² @ 250 nm). Refractive index and thickness measurements were made again after the UV cure. Final measurements were made following a hard bake in an oven at 150° C. for 60 minutes. Results from the measurements using various sample thicknesses, compositions, molecular weights (prior to curing) and conditions are found in the following TABLE 1. A wavelength-dependent refractive index was found to be $n=1.5+8.6 (\times 10^{-3} \mu m^2)/\lambda^2$, with wavelength, λ, in microns. At 635 nm, the refractive index for Sample 1 (PC-2000) was about 1.50; Sample 2 (PC2003), about 1.51, and Sample 3 (PC 2010), about 1.55.

TABLE 1

| Polymer Molecular Weight | Condition | R.I = A + B/$\lambda^2$ | | Refractive Index (R.I.) at 635 nm | Thickness (Å) |
|---|---|---|---|---|---|
| | | A | B(×10$^{-3}$ $\mu$m$^2$) | | |
| Sample 1 | 100° C., 20 min | 1.4973 | 4.7108 | 1.51 | 3902 |
| 5–7.5 | UV Exposure | 1.5018 | 5.0885 | 1.50 | 3887 |
| kg/mole | 150° C., 60 min | 1.5029 | 4.1141 | 1.50 | 3933 |
| Sample 2 | 100° C,, 20 min | 1.4960 | 9.4785 | 1.51 | 2493 |
| 2–3.5 | UV Exposure | 1.5019 | 6.6530 | 1.51 | 2577 |
| kg/mole | 150° C., 60 min | 1.5000 | 8.6167 | 1.52 | 2598 |
| Sample 3 | 100° C., 20 min | 1.5186 | 7.4340 | 1.53 | 1810 |
| 5–7.5 | UV Exposure | 1.5232 | 7.2295 | 1.54 | 1730 |
| kg/mole | 150° C., 60 min | 1.5204 | 7.3002 | 1.56 | 1753 |

EXAMPLE 2

Prism coupling was used to measure the optical losses in the films. To aid in adhesion, HMDS was spun onto each sample silicon wafer at 5000 rpm for 30 seconds and baked at 100° C. for 30 minutes. Siloxane resin compositions were prepared following the procedure for Sample 2 (PC-2003) in Example 1 (96 parts by weight structure (I) and 4 parts by weight of the iodonium salt catalyst solution). The compositions were dispensed through a 0.2 $\mu$m filter to improve film homogeneity, then spun onto wafers at 6000 rpm for 100 seconds. Any solvent remaining in the films was removed by vacuum. The undiluted compositions gave thicker films (about 5 $\mu$m), so the UV exposures were done at 6 J/cm$^2$. The final bake was done at 150° C. for 7 hours. Losses were measured using 635 and 840 nm light at various temperatures ranging from 150° C. to 300° C. The films were heated at this final temperature for 1 hour under 500 mtorr of N$_2$. After cooling to room temperature, the losses were measured on the films using a prism coupling setup. Losses of less than 0.5 dBcm$^{-1}$ and as low as 0.1 dBcm$^{-1}$ were observed for the 635 nm wavelength up to 200° C., and from about 0.29 to about 0.7 for the 840 wavelength for temperatures up to 300° C. These unexpectedly low losses are sufficiently low (<1 dBcm$^{-1}$) for both on-chip and chip-to-chip applications.

EXAMPLE 3

Additional samples were prepared following the procedure for Sample 1 (PC-2000), Example 1, except that each siloxane resin composition contained 20 parts by weight structure (I), 0.1 parts by weight catalyst solution, and 80 parts by weight MEK/PMA. HMDS was dispensed on silicon wafers for adhesion. The homopolymer compositions were then spun onto the silicon wafers at 6000 rpm for 100 seconds, then baked in an oven at 100° C. for 20 minutes to remove the solvent. The samples were allowed to cool under ambient conditions for 15 minutes. There was no UV curing. Instead, the polymers were thermally cured by baking at 165° C. for 2 hours. Optical losses of the deposited films were measured at 635 nm and at 840 nm. After a 200° C. and a 300° C. anneal, optical losses were measured again at those wavelengths. The measurements are found in TABLE 2, which shows the measured average loss and standard deviation in the measurements.

TABLE 2

| Loss (dBcm-1) @ 635 nm | | | Loss (dBcm-1) @ 840 nm | | |
|---|---|---|---|---|---|
| No anneal | 220° C., 1 hr | 300° C., 1 hr | No anneal | 200° C., 1 hr | 300° C., 1 hr |
| 0.21 ± 0.3 | 0.16 ± 0.1 | 0.14 ± 0.1 | 0.17 ± 0.1 | 0.17 ± 0.2 | 0.18 ± 01 |

As indicated, the thermal stability was exceptionally good and the optical loss was exceptionally low in materials with low catalyst content. Optical loss values as low as 0.14±0.1 dB/cm were observed. In fact, a heat treatment up to 300° C. led to no significant increase in optical loss at 635 nm and 830 nm.

EXAMPLE 4

Siloxane polymer resin solutions (Polyset PC-2000), denoted as Samples 4 and 5, were prepared. Samples 4 and 5 contained homopolymer siloxanes depicted above as structure (I)(only units X, q=0). The molecular weights of the uncured resin samples 4 and 5 ranged from 5 to 7.5 kg/mole (Polyset PC-2000). Sample 4 contained 20 parts by weight PC-2000 (structure (I)) and 80 parts by weight mesitylene. Sample 5 was the same as Sample 4 except that it also contained a catalyst, i.e., 0.1 parts by weight of a catalyst solution, which was a 40 wt. % solution of [4-(2-hydroxy-1-tetradecyloxy)-phenyl]phenyliodonium hexafluoroantimonate (Polyset PC-2506) dissolved in 3,4-epoxycyclohexylmethyl 3',4'-epoxycyclohexanecarboxylate (Union Carbide ERL-4221E). The homopolymer compositions were then spun onto the silicon wafers at 6000 rpm for 100 seconds, kept at room temperature for 20 minutes, then baked in an oven at 100° C. for 20 minutes under vacuum. The samples were allowed to cool under ambient conditions for 15 minutes. Sample 4 (no catalyst) was then heated at 225° C. for two hours. Sample 5 was then thermally cured by baking at 165° C. for 1 hour, then at 185° C. for 1 hour.

EXAMPLE 5

Siloxane polymer resin solutions, denoted as Samples 6 and 7 were prepared, each containing both monomers X and Y. In the resulting siloxane polymers (PC 2026), R$^8$ was methyl; R$^1$ was methyl, and FG was 2-(3,4-epoxycyclohexylethyl) in the X units; and R$^3$ was trifluoropropyl, and R$^4$ was methyl in the Y units. The molecular weights of the uncured resin samples ranged from 5 to 7.5 kg/mole. The molal ratio of X:Y in both samples 6 and 7 was 3:1. Samples 6 and 7 contained 20 parts by weight PC-2026 and 80 parts by weight mesitylene. However, Sample 7 also contained 0.1 parts by weight of a catalyst curing solution, which was a 40 wt. % solution of [4-(2-hydroxy-1-tetradecyloxy)-phenyl]phenyliodonium hexafluoroantimonate (Polyset PC-2506) dissolved in 3,4-epoxycyclohexylmethyl 3',4'-epoxycyclohexanecarboxylate (Union Carbide ERL-4221 E). Each polymer solution was then spun onto a separate silicon wafer at 6000 rpm for 1 minute, then baked under vacuum in an oven at 100° C. for 60 minutes to remove the solvent. Sample 6 was then baked an additional 2 hours at 225° C. under $N_2$, and Sample 7 for 2 hours under $N_2$ at 180° C. A final annealing was done at 250° C. The R.I. of both samples was about 1.45 at a wavelength of 630 nm.

Cladding

The cladding material of the present optical waveguides may be any suitable waveguide material that has a lower refractive index ($\Delta n \geq 0.02$) than the above-described light-transmitting siloxane core. As previously mentioned, high refractive index differences between the core and the cladding are preferred.

In one embodiment both waveguide core and cladding can be siloxane polymer resin compositions, as indicated by the refractive index measurements of the polymers in Example 1. The refractive index of Sample 3 (PC-2010) (after heating and curing) was measured to be about 1.56. Likewise, the refractive index for Sample 1 (PC-2000) was about 1.50. Thus, a waveguide structure comprising the polysiloxane compostion of Sample 1 as the cladding and that of Sample 3 as the core is included in the present invention. In this case $\Delta n$ is about 0.06. However, by manipulating the ligands in X and Y, the refractive index of each polymer can be varied by as much as 0.1.

Another embodiment wherein both waveguide core and cladding are siloxane polymer compositions is a waveguide in which the core is PC-2000 (R.I.=1.50)(see Sample 1) and the cladding is PC-2026 (R.I=1.45)(see Samples 6 and 7).

Other suitable cladding materials include silica xerogels, silicon oxide, metal oxides, air, silicon dioxide, benzocyclobutene, plasma oxides, acrylates, fluorinated acrylates, polyimides, and other polymers having a lower refractive index than the core. Particularly useful cladding materials are porous silica xerogels, also referred to herein as "porous silicon oxide". Silica xerogels are a highly porous class of dielectrics, having billions of microscopic nanopores or bubbles which contain air. Typical porosities range from about 30% to about 70%. Furthermore, porous silicon oxide films are optically transparent. It should be noted, however, that the invention is not limited to the use of porous silica xerogels, and other porous dielectrics may be used, as would be known to those of skill in the art. As used herein, "porous" refers to materials containing from about 25% to about 90% air.

The refractive index of a silica xerogel is related to its porosity by the following empirical corrrelation: n=1.458–0.458$\epsilon$, wherein n is the refractive index of the xerogel, and $\epsilon$ is the porosity. Typically, the refractive index, n, of porous silicon oxide (SiO) ranges from about 1.1 to about 1.34, which is sufficiently less than the above-mentioned refractive indices of the siloxane materials. Furthermore, xerogel exhibits negligible absorption and scattering, has good processability, and its thickness and porosity can easily be controlled. Thus, silica xerogels make excellent materials for use as claddings in the present optical waveguides.

In general, silica xerogels, as well as other porous xerogels, can be prepared by a conventional wet chemistry sol-gel process, which includes the hydrolysis and condensation of TetraEthylOrthoSilicate (TEOS), i.e., [Si(OC$_2$H$_5$)$_4$]. More particularly, TEOS is hydrolyzed by a reaction with water in the presence of a mutual solvent and a catalyst. During the condensation reaction, a molecule of water or alcohol is released and bond formation (—Si—O—Si—) occurs. As this reaction proceeds, larger silicates are formed by continuing bond formation and polymerization. Since TEOS is tetrafunctional, the chains that form by polymerization can cross-link to form a three dimensional structure. Close to the gel point, bonds form at random between nearly stationary clusters, linking them in a network. At the gel point, a single cluster extends throughout the sol. This spanning cluster coexists with a sol phase (i.e., partially reacted TEOS, ethanol and water) containing many smaller clusters, which gradually become attached to the network in a process called aging. More details outlining the structure and preparation of silica xerogel film are given in Nitta et al., *J. Vacuum Sci. & Techn. B*, 17, 205–12 (1999).

The pores of these conventionally prepared silica xerogels are solvent filled, and the solvent is then removed by drying, which does not collapse or crack the structure. An ambient pressure drying which involves a pre-drying surface modification step may be used. In this step, the hydroxyl groups on the surface are replaced with inert methyl groups by reacting the wet gel with Tri-MethylChloroSilane (TMCS). Thus, prior to drying, the surface of the pores are modified using TMCS, which prevents the pores from collapsing. A two hour anneal at 250° C. completes the solvent removal.

Optical Waveguides

The present invention includes novel optical waveguide structures which exhibit excellent optical loss properties, as well as a method for forming these novel waveguides.

Briefly, according to the present method, a layer of cladding material is formed over a suitable substrate (listed below). Typically, the thickness of the cladding is no greater than 10 $\mu$m and no less than 0.5 $\mu$m, but is more preferably from 1–5 $\mu$m. The siloxane core resin composition is then deposited into a thin film atop the cladding. The thickness of the siloxane core resin composition preferably ranges from about 0.5 $\mu$m to about 10 $\mu$m. Before or after curing, the core siloxane material can optionally be patterned using known methods such as photolithography, wet etching, reactive ion etching (RIE), photoablation, etc.

Reference is now made to the drawing figures wherein reference numerals are used throughout multiple figures to designate the same or similar components. FIG. 1 is a cross-sectional view of a portion 10 of a structure illustrating the process of the present invention for fabricating an optical waveguide structure. In general, first layer 30 of a cladding material is formed onto substrate 20 by any known method, such as by spin casting, dip coating, roller coating, doctor blading, or evaporating. Typically, spin casting is used. Substrate 20 may be any material upon which it is desired to establish a waveguide, such as semiconductor materials (silicon, silicon oxide, silicon oxide/silicon, gallium arsenide, silicon nitride, silica on silicon, etc.), as well as glass, plastics, quartz, ceramics, or crystalline materials. In addition, the surface of substrate 20 is preferably planar.

When first cladding layer 30 comprises silica xerogel, and substrate 20 is a silicon wafer, adhesion may optionally be improved by hydroxylating the surface of the wafer prior to deposition of first cladding layer 30. This can be achieved, for example, by dipping wafer substrate 20 into an ammonium hydroxide/peroxide mixture at 70° C. for a couple of minutes.

Alternatively, when first cladding layer 30 comprises a cladding siloxane material, an optional adhesion layer 25 may be deposited directly onto silicon substrate 20 prior to deposition of first cladding layer 30. A suitable adhesion material is HMDS, for example. The cladding siloxane material of first layer 30 is formed by depositing over substrate 20 (and optionally adhesion layer 25) a cladding film containing a cladding siloxane resin composition, preferably by spin-casting. The cladding siloxane resin composition includes a cladding siloxane polymer containing structural units X, and optionally Y, and also optionally including therewith a catalyst solution, as described herein. As previously described, the siloxane resin composition of the cladding may have been diluted with solvent, such as 50/50 MEK/PMA or mesitylene, to form a cladding film containing up to about 95 wt. % solvent, but preferably from about 28 wt. % to about 95 wt. % solvent. In this case, the excess solvent will then need to be removed from the cladding siloxane film, most typically by heating before curing. A vacuum may also be used to assist in removing solvent.

Waveguide design parameters such as core layer thickness, bending radii and inter-waveguide separation depend on the refractive indices and thickness of first cladding layer 30. Preferably, first cladding layer 30 has a thickness ranging from about 0.5 $\mu$m to about 10 $\mu$m, but preferably ranging from about 1 $\mu$m to about 5 $\mu$m.

In addition, when a silica xerogel is being used as the cladding material, the porosity of first cladding layer 30, as well as the thickness, should be controlled. Generally, a lower porosity provides better adhesion of subsequent films to the xerogel film. The more solvent trapped in the film while the silica cluster is formed, the higher the porosity obtained. For use as a cladding material, the porosity preferably ranges from about 30 to 70%, but more preferably from about 30 to 65%. Porosity can be easily controlled by known methods, such as by saturating the spin-coater with solvent (closed spin-coater) or adding a cosolvent with ethanol (open spinning). Ethylene glycol, which has a low vapor pressure is suitable for use as a cosolvent.

Atop first cladding material layer 30, core layer 40 is deposited to provide the high refractive index core material. Core layer 40 comprises a core siloxane polymer (structural units X, and optionally Y) and the optional catalyst solution, as described above. As mentioned, the core siloxane resin composition may be diluted with a solvent to form a solution containing up to about 95 wt. % solvent, but preferably from about 28 wt. % to about 95 wt. % solvent. Again, any of the above known methods can be used to form core layer 40, but spin casting is most preferable. Solvent is removed as previously described, by heating or by heating/vacuum. The thickness of core layer 40 should range from about 0.5 $\mu$m to about 10 $\mu$m, but is preferably about 2 $\mu$m. When a catalyst solution is included, thermal polymerization or polymerization by irradiation maybe performed after any excess solvent is removed. Otherwise, core film 40 is simply heated, as previously described to cure the composition.

Figure 2:
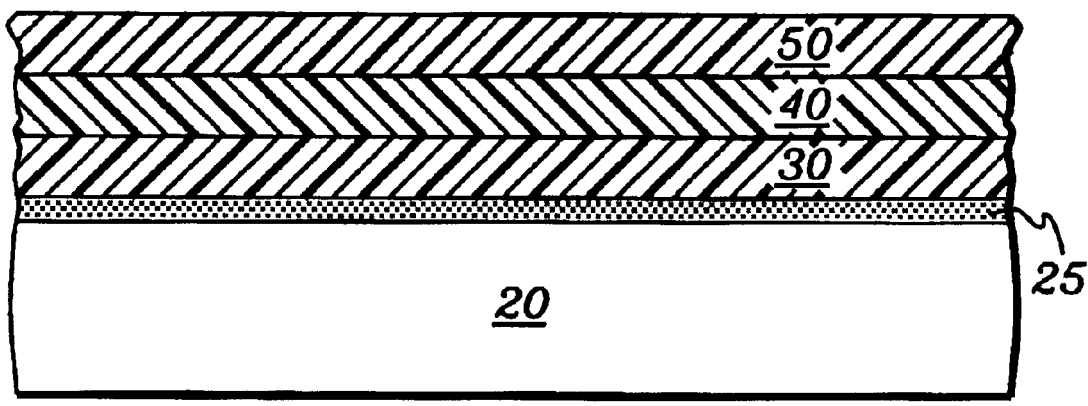
FIG. 2 is a cross-sectional view of the optical waveguide shown in FIG. 1 except that a second cladding layer has been deposited atop the core layer, in accordance with the method of the present invention.

Optionally, as shown in FIG. 2, an overcoat layer may then be deposited atop siloxane core layer 40 to form second cladding layer 50. Otherwise, air acts as a top cladding, as shown in the embodiment of FIG. 1, i.e., where no second cladding layer 50 is deposited. When layer 50 is employed, layer 50 typically ranges in thickness from about 0.5 to a few microns, but is preferably greater than 1 $\mu$m and less than 5 $\mu$m. Such a thickness provides sufficient ambient protection and optical confinement for core layer 40. Second cladding layer 50 can be the same material used to form first cladding layer 30. FIGS. 1 and 2 are cross-sectional views of a portion 10 of an exemplary planar or slab optical waveguide, shown respectively without and with second cladding layer 50.

Figure 3:
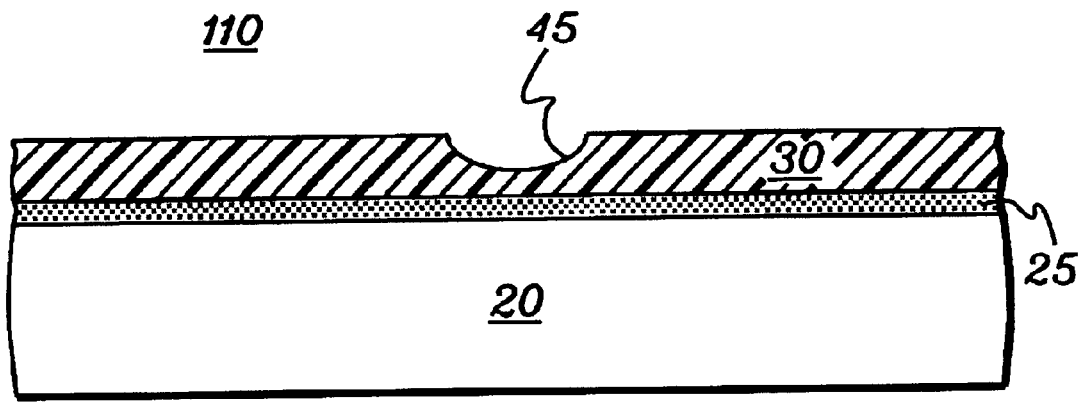
FIGS. 3–5 are cross-sectional views of an alternative preferred optical waveguide embodiment fabricated by the method of the present invention.

FIG. 3 is a cross-sectional view of portion 110 of a structure illustrating the process of the present invention to form an alternative waveguide embodiment. In this case, first cladding layer 30 is patterned to form groove 45 prior to deposition of core layer 40. Conventional patterning methods, such as wet etching, or reactive ion etching (RIF) may be used to form groove 45 to a predetermined depth, generally from about 1 to 5 $\mu$m, in first cladding layer 30 without etching through to or uncovering substrate 20. Furthermore, when first cladding layer 30 is one of the siloxane polymer compositions containing a catalyst, as described above, photoablation using a focused beam light source (laser) or photolithography may also be used to pattern first cladding layer 30. The aforementioned patterning techniques simplify processing requirements and therefore make the present method ideal for practicing on a commercial scale. The methods are described in more detail below.

Figure 4:
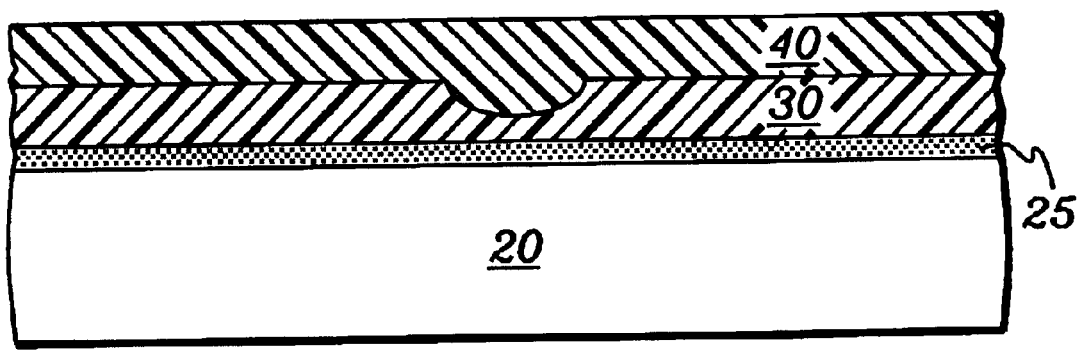

Next, in this embodiment, as shown in portion 110 of FIG. 4, core siloxane resin composition layer 40 is deposited onto cladding layer 30 and into groove 45, followed by removal of the solvent, optional catalytic polymerization, and curing to form a light-transmitting siloxane core material having a refractive index higher than that of first cladding layer 30.

Figure 5:
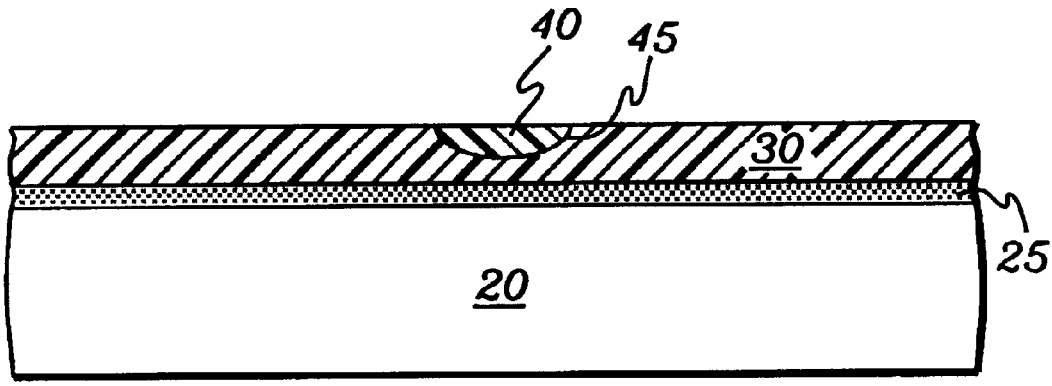

Next, as shown in portion 110 of FIG. 5, the light-transmitting siloxane core material formed from core layer 40 is removed from atop first cladding layer 30, typically by RIE or wet etching, such that core material 40 remains only in groove 45. If desired, light-transmitting core material 40 in groove 45 can be coplanarized with first cladding layer 30, typically by chemical mechanical polishing. Then, if desired, second layer 50 of cladding material (not shown), as previously described, can be deposited and formed atop first cladding layer 30 and light-transmitting core material 40 in groove 45 to complete exemplary channel waveguide portion 110.

Figure 6:
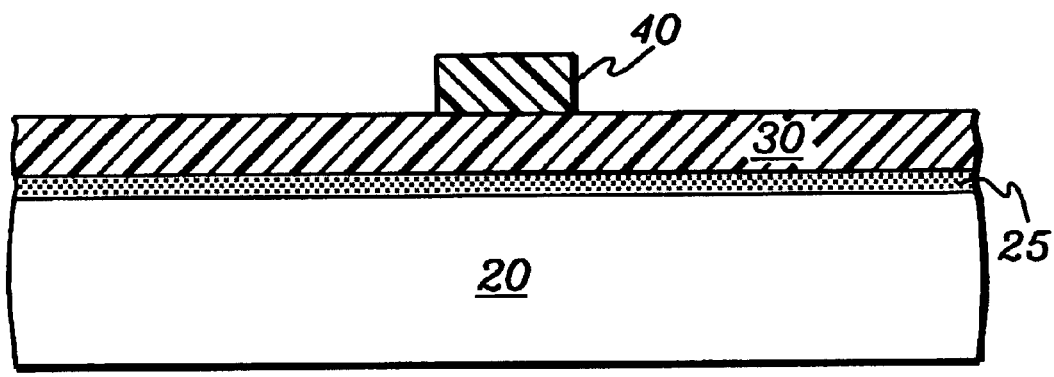
FIGS. 6–8 are cross-sectional views of a another preferred optical waveguide embodiment fabricated by the method of the present invention.

In yet another embodiment, core layer 40 of portion 10 shown in FIG. 1 is patterned prior to deposition of second cladding layer 50, either before, simultaneously, or after curing is completed to form portion 210 illustrated in FIG. 6. Typically one of the patterning techniques previously mentioned is used to form intermediate structure 210 wherein a portion of first cladding layer 30 becomes uncovered or free of any light-transmitting core material, while a section of light-transmitting core material (if cured) or core layer (if uncured) 40 remains atop first cladding layer 30.

As noted, a laser may be used to pattern siloxane core layer 40 (or first cladding layer 30 comprising a siloxane resin composition, as shown in portion 110 of FIG. 3). When this technique is used, the siloxane composition should also include a catalyst solution. Further polymerization of the siloxane resin composition can be then be initiated by actinic radiation, and the material may be patterned at the same time by moving either the substrate or the beam source (while the other remains stationary) in such a way that the directed beam or focused beam contacts only the desired predetermined regions of the siloxane resin composition. Removal of the unexposed material by wet solvent uncovers first cladding layer 30 of FIG. 6 or forms groove 45 in FIG. 3. These directed or focused beam techniques are well-known in the art as "direct-writing" methods.

With photolithography, a mask having the desired waveguide pattern is placed between the catalyst containing siloxane core layer 40 of FIG. 1 (or siloxane cladding 30 of FIG. 3), and the source of actinic radiation. The mask has transparent and opaque portions which allow the radiation to pass only through the transparent portions and fall only on the regions where further polymerization is desired. Typically, an incoherent light source is used in the photolithographic technique.

Alternatively, after thermal or photoinitiated curing, siloxane core 40 can be masked, and the unmasked areas can be etched by dry etch techniques, such as by reactive ion etching (RIE), as one of skill would know. Good etch rates of the siloxane polymer material described herein have been achieved using an oxygen RIE, or mixed $O_2/CHF_3$ RIE, making ridge waveguides another application for the present materials.

Figure 7:
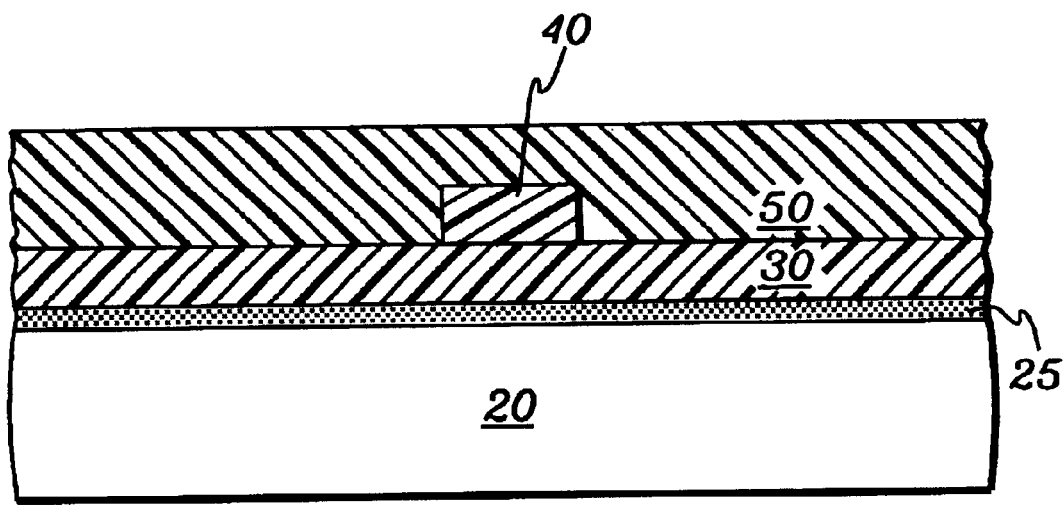
Figure 8:
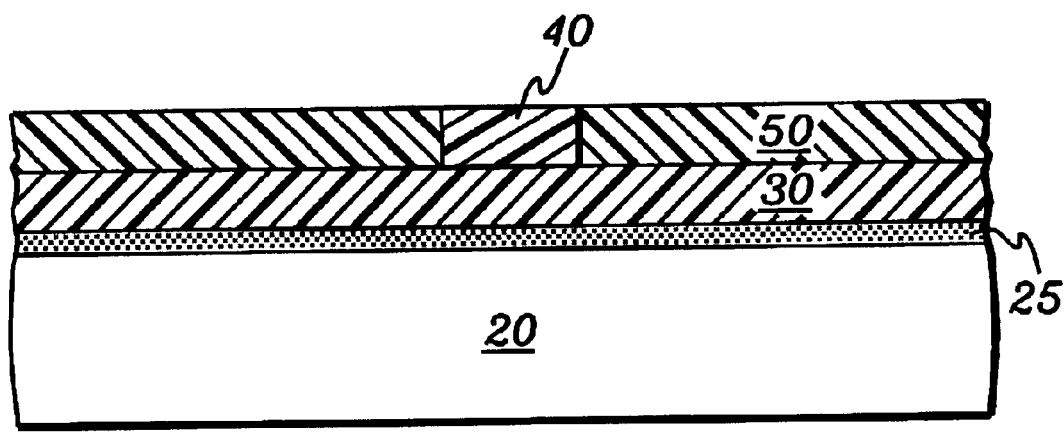

Next, in this embodiment, as shown with respect to portion 210 in FIG. 7, second cladding layer 50 is deposited atop the uncovered portion of first cladding layer 30 and atop the section of light-transmitting core layer 40 (having a typical thickness ranging from about 1 to 5 microns) remaining on first cladding layer 40. The typical thickness for the second cladding layer 50 ranges from about 1 to 5 microns above the top surface of core 40. Optionally, as shown in FIG. 8, second cladding layer 50 can be coplanarized with core 40, typically by chemical mechanical polishing to form the final channel waveguide structure portion 210.

EXAMPLE 6

Samples were prepared and cured according to the procedure described in Example 3 (PC-2000). Using a plasma gas containing $O_2$ diluted with $CHF_3$, etch rates ranging from about 40 to about 400 nm/min were obtained at 40 mtorr pressure and 150 W RF power. For example, an etch rate of about 40 nm/min was obtained using a gas mixture that contained 10% $O_2$ and about 90% $CHF_3$.

EXAMPLE 7

Planar waveguides were made on 3" silicon wafer substrates using the siloxane resin composition of Sample 2 (PC-2003) in Example 1 as the high refractive index core material, and silica xerogel as the cladding. The xerogel cladding films had porosities ranging from 30–65% and were spin-coated on each wafer to a thickness of about 1 $\mu$m. The substrate temperature during deposition was controlled, and xerogel films were deposited on substrates having temperatures of 150° C., 200° C., 250° C. and 300° C. No adhesion promoter was required because the xerogel surface was modified during processing, which rendered the surface hydrophobic.

The UV curable polymer core material was then spun-onto the xerogel cladding films to a thickness of about 2 $\mu$m (6000 rpm for 100 sec.) Next the samples were baked at 100° C. for 20 minutes to remove the solvent. The polymer was then UV cured, followed by a final anneal at 150° C.

The fabricated planar polymer-xerogel waveguides exhibited a loss of less than 0.5 dB/cm, measured at 635 nm, and the refractive index contrast (An) between the core and cladding was 0.34.

The disclosures of the foregoing journal articles, patents, and patent applications are incorporated herein by reference.

Definitions:

"Alkyl" is intended to include linear, branched, or cyclic hydrocarbon structures and combinations thereof. "Lower alkyl" refers to alkyl groups having from 1 to 4 carbon atoms. Examples of lower alkyl groups include methyl, ethyl, propyl, isopropyl, butyl, s-and t-butyl and the like. Preferred alkyl groups are those of $C_{20}$ or below. "Cycloalkyl" is a subset of alkyl and includes cyclic hydrocarbon groups of from 3 to 8 carbon atoms. Examples of cycloalkyl groups include c-propyl, c-butyl, c-pentyl, c-hexyl, norbornyl and the like. Haloalkyl" includes chloromethyl, 3-chloropropyl, 3,4-dichlorophenyl, dichloromethyl, trichloromethyl, fluoromethyl, difluoromethyl, trifluoromethyl, and the like.

"Alkoxy" or "alkoxyl" refers to groups of from 1 to 20 carbon atoms of a straight, branched, cyclic configuration and combinations thereof attached to the parent structure through an oxygen. Examples include methoxy, ethoxy, propoxy, isopropoxy, cyclopropyloxy, cyclohexyloxy and the like. "Lower-alkoxy" refers to groups containing one to four carbons.

"Aryl" refers to a 5- or 6-membered aromatic ring; a bicyclic 9- or 10-membered, partially or fully aromatic ring system; or a tricyclic 13- or 14-membered partially or fully aromatic ring system optionally substituted with 1–3 lower alkyl, halo lower alkyl, =O, —$NO_2$, halogen, hydroxy, alkoxy, cyano, phenyl, benzyl, phenoxy or benzyloxy. The aromatic 6- to 14-membered carbocyclic rings include, e.g., benzene, naphthalene, indane, tetralin, and fluorene.

"Arylalkyl" means an alkyl residue attached to an aryl ring. Examples are benzyl, phenethyl and the like.

We claim:

1. An optical waveguide structure comprising a light-transmitting core material having a first refractive index, and a cladding material contacting and partially or entirely surrounding said core material, wherein said cladding material has a second refractive index lower than said first refractive index of said core material, and wherein said core material is a siloxane resin composition comprising:

(A) from about 95 to about 100 parts by weight of a siloxane polymer comprising structural units having the formulae X and Y:

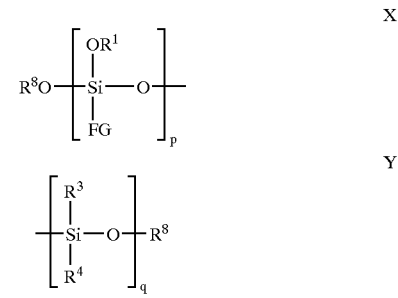

and terminating in residues $OR^8$ and $R^8$, wherein (1) FG is a functional group, and each FG in said polymer is independently chosen from (a) linear, branched, and cyclic alkyl residues of 1 to 20 carbons terminating in a 1-alkenyl ether;

(b) linear, branched, and cyclic alkyl ether residues of 1 to 20 carbons and 1 to 9 oxygens terminating in a 1-alkenyl ether;

(c) linear, branched, and cyclic alkyl residues of 1 to 20 carbons terminating in an acrylate, an alpha-chloroacrylate, an alpha-cyanoacrylate, or a methacrylate;

(d) linear, branched, and cyclic alkyl ether residues of 1 to 20 carbons and 1 to 9 oxygens terminating in an acrylate, an alpha-chloroacrylate, an alpha-cyanoacrylate, or a methacrylate;

(e) linear, branched, and cyclic alkyl residues of 1 to 20 carbons substituted with an epoxide;

(f) linear, branched, and cyclic alkyl ether residues of 1 to 20 carbons and 1 to 9 oxygens substituted with an epoxide;

(g) arylalkyl residues of 1 to 20 carbons substituted with an epoxide;
(h) arylalkyl ether residues of 1 to 20 carbons and 1 to 9 oxygens substituted with an epoxide; and
(i) epoxy-functional organosiloxane residues of 1 to 20 silicons and 1 to 20 carbons;

(2) R is alkyl, aryl, haloalkyl, or aralkyl of 1 to 10 carbons;

(3) $R^1$ is R,

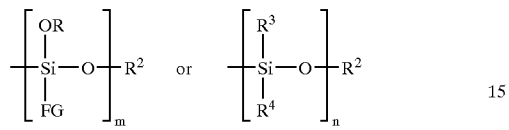

(4) $R^2$ is alkyl, aryl, haloalkyl or aralkyl of 1 to 10 carbons or

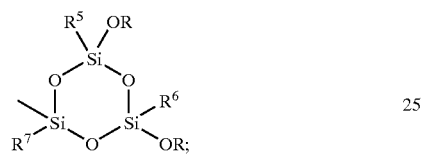

(5) $R^3$ and $R^4$ are independently alkyl, aryl, haloalkyl, aralkyl, alkoxy or aryloxy of 1 to 10 carbons;

(6) $R^5$, $R^6$ and $R^7$ are independently FG, alkyl, aryl, haloalkyl, aralkyl, alkoxy or aryloxy of 1 to 10 carbons;

(7) $R^8$ is alkyl, aryl, haloalkyl, or aralkyl of 1 to 10 carbons;

(8) m and n are each independently 2 to 50;

(9) p is 2 to 50; and

(10) q is 0 to 50; and (B) from 0 to about 5 parts by weight of a polymerization initiator selected from the group consisting of free radical initiators and cationic initiators selected from the group consisting of diazonium, sulfonium, phosphonium, and iodonium salts, wherein said selected cationic initiator is present in a catalyst solution comprising from about 20 to about 60 parts by weight of the selected cationic initiator and from about 40 to about 80 parts by weight of 3,4-epoxycyclohexylmethyl-3',4'-epoxycyclohexane carboxylate, dicyclopentadiene dioxide, or bis(3,4-epoxycyclohexyl) adipate.

2. The optical waveguide structure of claim 1, wherein said cladding material is selected from the group of porous silicon oxide, silicon oxide, metal oxides, air, silicon dioxide, benzocyclobutene, plasma oxides, siloxanes, fluorinated siloxanes, acrylates, fluorinated acrylates, and polyimides.

3. The optical waveguide structure of claim 1, wherein each FG has a structure independently chosen from the group consisting of residues of formulae A–Q:

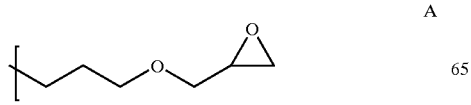

A

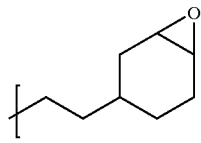

B

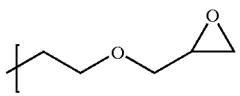

C

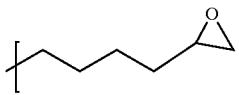

D

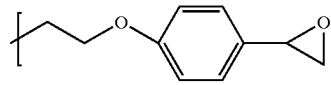

E

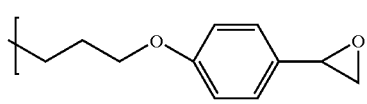

F

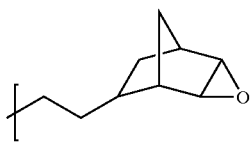

G

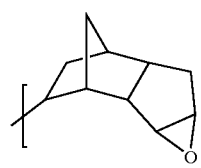

H

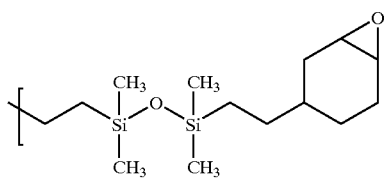

J

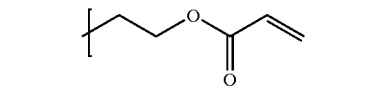

K

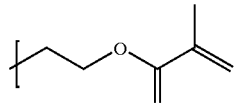

L

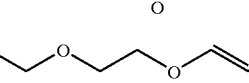

M

N

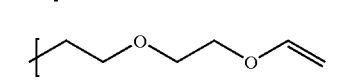

O

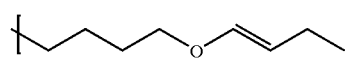

P

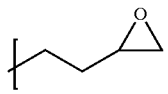

4. The optical waveguide of claim 3, wherein each FG is independently selected from the group consisting of 3-glycidoxypropyl, 2-(3,4-epoxycyclohexylethyl), and 1-propenoxy-2-ethoxyethyl.

5. The optical waveguide structure of claim 4, wherein q is 0 and said siloxane polymer in said core material comprises structure (I)

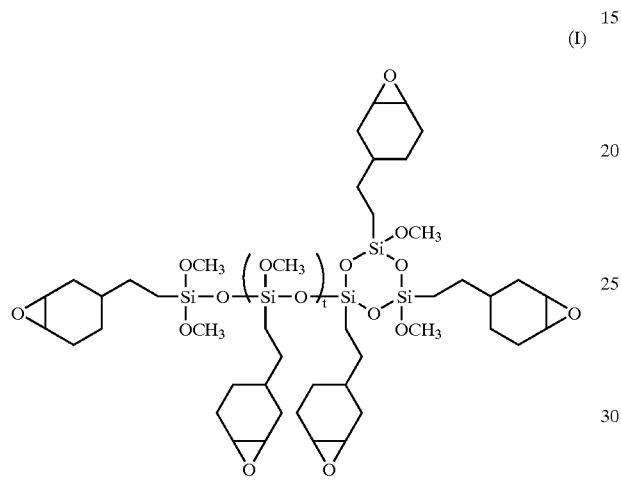

wherein t is an integer having a value from 2 to 20.

6. The optical waveguide structure of claim 4, wherein q is greater than 0 in said siloxane polymer of said siloxane resin composition of said core material.

7. The optical waveguide structure of claim 6, wherein $R^1$ is methyl or ethyl;

$R^2$ is selected from the group consisting of methyl, methoxy, ethyl, ethoxy, phenyl and

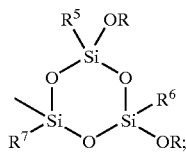

$R^3$ and $R^4$ are chosen independently from the group consisting of methyl, methoxy, ethyl, ethoxy, haloalkyl, and phenyl; and $R^5$, $R^6$ and $R^7$ are chosen independently from methyl, methoxy, ethyl, ethoxy, phenyl and FG; and $R^8$ is methyl or ethyl.

8. The optical waveguide structure of claim 7, wherein $R^1$ and $R^8$ are methyl, FG is 2-(3,4-epoxycyclohexylethyl), and $R^3$ and $R^4$ are phenyl.

9. The optical waveguide of claim 7, wherein $R^1$ and $R^8$ are methyl, FG is 2-(3,4-epoxycyclohexylethyl), and $R^3$ and $R^4$ are ethyl.

10. The optical waveguide of claim 7, wherein $R^1$, $R^8$ and $R^4$ are methyl, FG is 2-(3,4-epoxycyclohexylethyl), and $R^3$ is trifluoropropyl.

11. The optical waveguide structure of claim 1, wherein said polymerization initiator is a cationic initiator selected from the group of diaryliodonium salts and phenylacylsulfonium salts having formulae (II), (III), (IV), (V), (VI), and (VII)

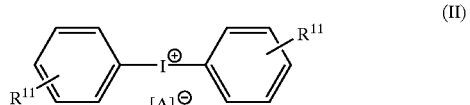

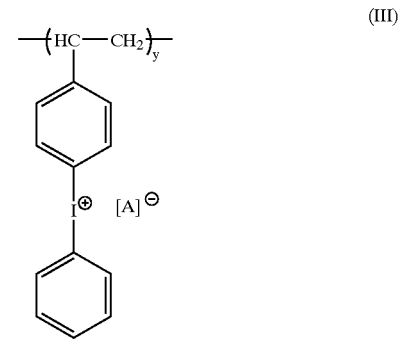

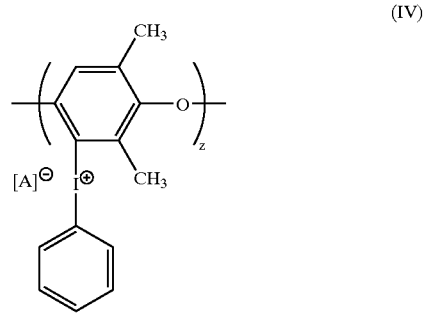

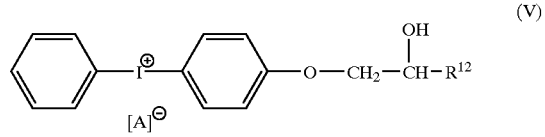

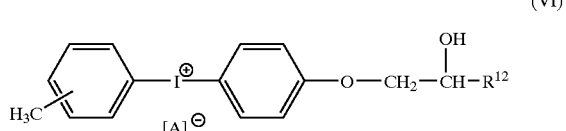

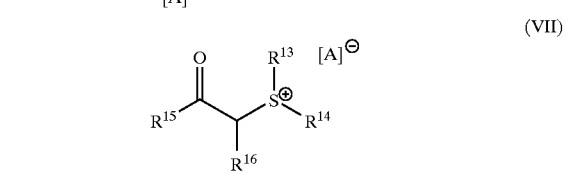

wherein each $R^{11}$ is independently hydrogen, $C_1$ to $C_{20}$ alkyl, $C_1$ to $C_{20}$ alkoxyl, $C_1$ to $C_{20}$ hydroxyalkoxyl, halogen, and nitro; $R^{12}$ is $C_1$ to $C_{30}$ alkyl or $C_1$ to $C_{30}$ cycloalkyl; y and z are each independently integers having a value of at least 5; $R^{13}$ is a $C_1$ to $C_{30}$ monovalent organic radical; $R^{14}$ is a $C_1$ to $C_{30}$ monovalent organic radical or a photosensitizing residue or $R^{13}$ and $R^{14}$ taken together forms a 5 or 6-membered ring; $R^{15}$ is $C_6$ to $C_{20}$ alkyl, aryl, $C_6$ to $C_{20}$ substituted alkyl or substituted aryl; $R^{16}$ is hydrogen or $C_1$ to $C_8$ alkyl; and $[A]^{\ominus}$ is a non-nucleophilic anion selected from the group of $SbF_6^{\ominus}$, $BF_4^{\ominus}$, $PF_6^{\ominus}$, $AsF_6^{\ominus}$, and $(C_6F_5)_4B^{\ominus}$.

12. An optical waveguide structure comprising:
(A) a light-transmitting core material comprising a first siloxane resin composition having a first refractive index, wherein said first siloxane resin composition comprises:
  (1) from about 95 to about 100 parts by weight of a first siloxane polymer;
  (2) from 0 to about 5 parts by weight of a first polymerization initiator selected from the group consisting of free radical initiators and cationic initiators selected from the group consisting of diazonium, sulfonium, phosphonium, and iodonium salts, wherein said selected cationic initiator is present in a catalyst solution comprising from about 20 to about 60 parts by weight of the selected cationic initiator and from about 40 to about 80 parts by weight of 3,4-epoxycyclohexylmethyl-3',4'-epoxycyclohexane carboxylate, dicyclopentadiene dioxide, or bis(3,4-epoxycyclohexyl) adipate; and
(B) a cladding material comprising a second siloxane resin composition having a second refractive index lower than said first refractive index of said first siloxane resin composition, wherein said cladding material contacts and partially or entirely surrounds said core material, and wherein said second siloxane resin composition comprises:
  (1) from about 95 to about 100 parts by weight of a second siloxane polymer;
  (2) from 0 to about 5 parts by weight of a second polymerization initiator selected from the group consisting of free radical initiators and cationic initiators selected from the group consisting of diazonium, sulfonium, phosphonium, and iodonium salts, wherein said selected cationic initiator is present in a catalyst solution comprising from about 20 to about 60 parts by weight of the selected cationic initiator and from about 40 to about 80 parts by weight of 3,4-epoxycyclohexylmethyl-3',4'-epoxycyclohexane carboxylate, dicyclopentadiene dioxide, or bis(3,4-epoxycyclohexyl) adipate;
wherein each said first and second siloxane polymer, respectively, comprises structural units X and Y

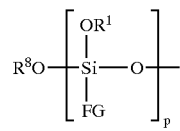

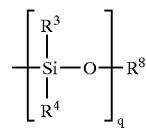

and terminates in $OR^6$ and $R^8$, and wherein each FG, R, $R^1$, $R^3$, $R^4$, $R^5$, $R^6$, $R^7$, $R^8$, m, n, p, and q of said first siloxane polymer is selected independently from that of said second siloxane polymer;
wherein
(1) FG is a functional group chosen from
  (a) linear, branched, and cyclic alkyl residues of 1 to 20 carbons terminating in a 1-alkenyl ether;
  (b) linear, branched, and cyclic alkyl ether residues of 1 to 20 carbons and 1 to 9 oxygens terminating in a 1-alkenyl ether;
  (c) linear, branched, and cyclic alkyl residues of 1 to 20 carbons terminating in an acrylate, an alpha-chloroacrylate, an alpha-cyanoacrylate, or a methacrylate;
  (d) linear, branched, and cyclic alkyl ether residues of 1 to 20 carbons and 1 to 9 oxygens terminating in an acrylate, an alpha-chloroacrylate, an alpha-cyanoacrylate, or a methacrylate;
  (e) linear, branched, and cyclic alkyl residues of 1 to 20 carbons substituted with an epoxide;
  (f) linear, branched, and cyclic alkyl ether residues of 1 to 20 carbons and 1 to 9 oxygens substituted with an epoxide;
  (g) arylalkyl residues of 1 to 20 carbons substituted with an epoxide;
  (h) arylalkyl ether residues of 1 to 20 carbons and 1 to 9 oxygens substituted with an epoxide; and
  (i) epoxy-functional organosiloxane residues of 1 to 20 silicons and 1 to 20 carbons;
(2) R is alkyl, aryl, haloalkyl, or aralkyl of 1 to 10 carbons;
(3) $R^1$ is R, or

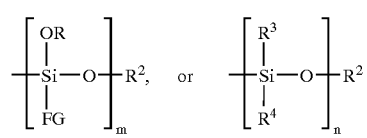

(4) $R^2$ is alkyl, aryl, haloalkyl or aralkyl of 1 to 10 carbons or

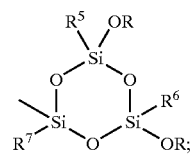

(5) $R^3$ and $R^4$ are independently alkyl, aryl, haloalkyl, aralkyl, alkoxy or aryloxy of 1 to 10 carbons;
(6) $R^5$, R6 and $R^7$ are independently FG, alkyl, aryl, haloalkyl, aralkyl, alkoxy or aryloxy of 1 to 10 carbons;
(7) $R^8$ is alkyl, aryl, haloalkyl, or aralkyl of 1 to 10 carbons;
(8) m and n are each independently 2 to 50;
(9) p is 2 to 50; and
(10) q is 0 to 50.
13. The optical waveguide structure of claim 12, wherein q is 0 in said first siloxane polymer of said core material, and q is an integer greater than 0 in said second siloxane polymer of said cladding material.
14. The optical waveguide structure of claim 13, wherein said first siloxane polymer is structure (I)

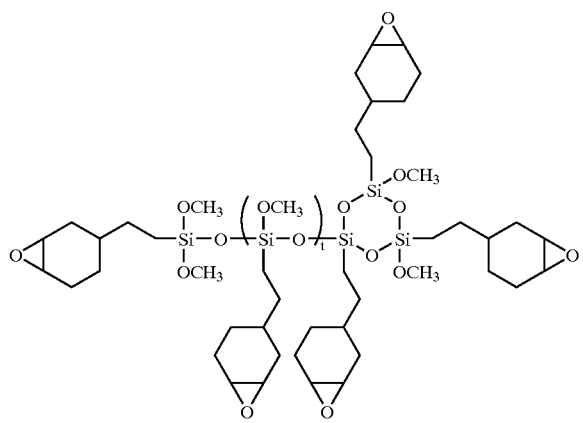

(I)

wherein t is an integer having a value from 2 to 20.

15. The optical waveguide structure of claim 13, wherein $R^1$ and $R^8$ are methyl, FG is 2-(3,4-epoxycyclohexylethyl), and $R^3$ and $R^4$ are phenyl in said second siloxane polymer.

16. The optical waveguide structure of claim 13, wherein $R^1$ and $R^8$ are methyl; FG is 2-(3,4-epoxycyclohexylethyl), and $R^3$ and $R^4$ are ethyl in said second siloxane polymer.

17. The optical waveguide of claim 13, wherein $R^1$, $R^8$ and $R^4$ are methyl, FG is 2-(3,4-epoxycyclohexylethyl), and $R^3$ is trifluoropropyl in said second siloxane polymer.

18. A method for fabricating an optical waveguide structure comprising:
(1) providing a substrate;
(2) forming a first layer of a cladding material over said substrate, wherein said cladding material has a second refractive index;
(3) depositing atop first layer of said cladding material a core layer comprising
(A) from 0 to about 95 wt. % of a solvent; and
(B) from about 5 to about 100 wt. % of a cure siloxane resin composition comprising:
(1) from about 95 to about 100 parts by weight of a core siloxane polymer, wherein said core siloxane polymer comprises structural units having the formulae X and Y

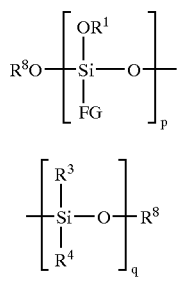

X

Y and terminates in $OR^8$ and $R^8$; wherein
(1) FG is a functional group chosen from
(a) linear, branched, and cyclic alkyl residues of 1 to 20 carbons terminating in a 1-alkenyl ether;
(b) linear, branched, and cyclic alkyl ether residues of 1 to 20 carbons and 1 to 9 oxygens terminating in a 1-alkenyl ether;
(c) linear, branched, and cyclic alkyl residues of 1 to 20 carbons terminating in an acrylate, an alpha-chloroacrylate, an alpha-cyanoacrylate, or a methacrylate;
(d) linear, branched, and cyclic alkyl ether residues of 1 to 20 carbons and 1 to 9 oxygens terminating in an acrylate, an alpha-chloroacrylate, an alpha-cyanoacrylate, or a methacrylate;
(e) linear, branched, and cyclic alkyl residues of 1 to 20 carbons substituted with an epoxide;
(f) linear, branched, and cyclic alkyl ether residues of 1 to 20 carbons and 1 to 9 oxygens substituted with an epoxide;
(g) arylalkyl residues of 1 to 20 carbons substituted with an epoxide;
(h) arylalkyl ether residues of 1 to 20 carbons and 1 to 9 oxygens substituted with an epoxide; and
(i) epoxy-functional organosiloxane residues of 1 to 20 silicons and 1 to 20 carbons;
(2) R is alkyl, aryl, haloalkyl, or aralkyl of 1 to 10 carbons;
(3) $R^1$ is R, or

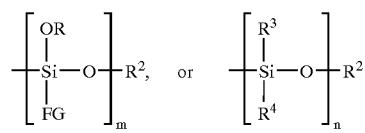

(4) $R^2$ is alkyl, aryl, haloalkyl, or aralkyl of 1 to 10 carbons or

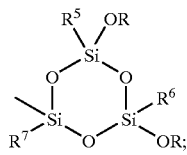

(5) $R^3$ and $R^4$ are independently alkyl, aryl, haloalkyl, aralkyl, alkoxy or aryloxy of 1 to 10 carbons;
(6) $R^5$, $R^6$ and $R^7$ are independently FG, alkyl, aryl, haloalkyl, aralkyl, alkoxy or aryloxy of 1 to 10 carbons;
(7) $R^8$ is alkyl, aryl, haloalkyl, or aralkyl of 1 to 10 carbons;
(8) m and n are each independently 2 to 50;
(9) p is 2 to 50; and
(10) q is 0 to 50;
and
(II) from 0 to about 5 parts by weight of a core polymerization initiator selected from the group consisting of amine curing agents, anhydride curing agents, free radical initiators, and cationic initiators selected from the group consisting of diazonium, sulfonium, phosphonium, and iodonium salts, wherein said selected cationic initiator is present in a catalyst solution comprising from about 20 to about 60 parts by weight of the selected cationic initiator and from about 40 to about 80 parts by weight of 3,4-epoxycyclohexylmethyl-3',4'-epoxycyclohexane carboxylate, dicyclopentadiene dioxide, or bis(3,4-epoxycyclohexyl) adipate; and
(4) curing said core layer thermally, or using actinic or e-beam radiation to form a light-transmitting core material having a first refractive index higher than said second refractive index of said cladding material.

19. The method of claim 18, further comprising after step (4), the step of (5) forming a second layer of said cladding material atop said light-transmitting core material.

20. The method of claim 18, further comprising after step (4), the steps of (5) patterning said light-transmitting core material, wherein a portion of said first layer of said cladding material is free of said light-transmitting core material; and (6) forming a second layer of said cladding material atop said light-transmitting core material and said portion of said first layer of said cladding material free of said light-transmitting core material.

21. The method of claim 20, wherein said curing step (4) is performed using actinic radiation and is performed simultaneously with said patterning step (5).

22. The method of claim 18, further comprising between steps (3) and (4) the step of patterning said core layer, wherein a portion of said first layer of said cladding material is free of said core layer.

23. The method of claim 22, further comprising after step (4) the step (5) of forming a second layer of said cladding material atop said core layer and atop said portion of said first layer of said cladding material free of said core layer.

24. The method of claim 18, further comprising between steps (2) and (3), the step of forming a groove in said first layer of said cladding material, wherein said substrate remains covered;
wherein said core layer in step (3) is also deposited into said groove; and further comprising after step (4), the step of (5) removing said light-transmitting core material overlying said first layer of cladding material, wherein said light-transmitting core material remains in said groove.

25. The method of claim 24, further comprising after step (5), the step (6) of forming a second layer of said cladding material atop said first layer of said cladding material and atop said light-transmitting core material.

26. The method of claim 18, further comprising between steps (1) and (2), the additional step of depositing an adhesion layer atop said substrate, and forming said first layer of said cladding material layer atop said adhesion layer.

27. The method of claim 18, further comprising between steps (3) and (4), when said core layer contains said solvent, the additional step of removing said solvent.

28. The method of claim 18, further comprising after step (4), the additional step of removing said solvent when said core layer contains said solvent.

29. The method of claim 18, wherein said first layer of said cladding material is selected from the group of porous silicon oxide, silicon oxide, metal oxides, air, silicon dioxide, benzocyclobutene, plasma oxides, siloxanes, fluorinated siloxanes, acrylates, fluorinated acrylates, and polyimides.

30. The method of claim 18, wherein said first layer of said cladding material in step (2) comprises a cladding siloxane material formed by:

(I) depositing over said substrate a cladding film containing from about 5 to about 100 wt. % of a cladding siloxane resin composition and from 0 to about 95 wt. % of a solvent, wherein said cladding siloxane resin composition comprises:

(A) from about 95 to about 100 parts by weight of a cladding siloxane polymer comprising structural units having the formulae X and Y and terminating in $OR^8$ and $R^8$ in accordance with claim 1, and wherein each FG, R, $R^1$, $R^3$, $R^4$, $R^5$, $R^6$, $R^7$, $R^8$, m, n, p, and q of said cladding siloxane polymer is selected independently from that of said core siloxane polymer; and (B) from 0 to about 5 parts by weight of a cladding polymerization initiator selected from the group consisting of amine curing agents, anhydride curing agents, free radical initiators, and cationic initiators selected from the group consisting of diazonium, sulfonium, phosphonium, and iodonium salts, wherein said selected cationic initiator is present in a catalyst solution comprising from about 20 to about 60 parts by weight of the selected cationic initiator and from about 40 to about 80 parts by weight of 3,4-epoxycyclohexylmethyl-3',4'-epoxycyclohexane carboxylate, dicyclopentadiene dioxide, or bis(3,4-epoxycyclohexyl) adipate;

wherein said cladding polymerization initiator and amount thereof are independent of said core polymerization initiator and amount thereof; and (II) curing said cladding siloxane polymer in said cladding siloxane resin composition thermally, or using actinic or e-beam radiation, to form said cladding material having said second refractive index lower than said first refractive index of said core material.

31. The method of claim 30, further comprising between steps (I) and (II), when said cladding film contains said solvent, the additional step of removing said solvent.

32. The method of claim 30, further comprising after step (II), when said cladding film contains said solvent, the additional step of removing said solvent.

* * * * *